(12) United States Patent
Zhou et al.

(10) Patent No.: US 6,498,680 B1
(45) Date of Patent: Dec. 24, 2002

(54) COMPACT TUNABLE OPTICAL WAVELENGTH INTERLEAVER

(75) Inventors: Gan Zhou, Plano, TX (US); Kuang-Yi Wu, Plano, TX (US); Sihan Lin, Lewisville, TX (US); Ding Wang, Dallas, TX (US)

(73) Assignee: Chorum Technologies LP, Richardson, TX (US)

( * ) Notice: Subject to any disclaimer, the term of this patent is extended or adjusted under 35 U.S.C. 154(b) by 0 days.

(21) Appl. No.: 09/717,050

(22) Filed: Nov. 20, 2000

Related U.S. Application Data

(63) Continuation-in-part of application No. 09/547,812, filed on Apr. 11, 2000, now Pat. No. 6,243,200, and a continuation-in-part of application No. 09/391,733, filed on Sep. 8, 1999, now Pat. No. 6,208,444, which is a continuation-in-part of application No. 09/274,270, filed on Mar. 22, 1999, now Pat. No. 6,163,393, which is a continuation-in-part of application No. 09/240,550, filed on Jan. 29, 1999, now Pat. No. 5,978,116, which is a continuation of application No. 08/739,424, filed on Oct. 29, 1996, now Pat. No. 5,867,291.
(60) Provisional application No. 60/186,314, filed on Mar. 2, 2000.

(51) Int. Cl.$^7$ ............................ G02B 5/30; H04J 14/02; H04J 14/06
(52) U.S. Cl. .................. 359/487; 359/495; 359/497; 359/900; 359/122; 359/124
(58) Field of Search .................. 359/487, 495, 359/497, 900, 122, 124; 356/453, 454, 491

(56) References Cited

U.S. PATENT DOCUMENTS

| | | |
|---|---|---|
| 4,006,426 A | 2/1977 | Lacour |
| 4,746,216 A * | 5/1988 | Sommargren |
| 4,919,522 A | 4/1990 | Nelson |
| 4,950,078 A | 8/1990 | Sommargren |
| 5,136,671 A | 8/1992 | Dragone |

(List continued on next page.)

OTHER PUBLICATIONS

Ammann, "Synthesis of Electro–Optic Shutters having a Prescribed Transmission vs Voltage Characteristic", Journal of the Optical Society of America (vol. 56, No. 8, pp. 1081–1088, Aug. 1966).

Harris et al., "Optical Network Synthesis Using Birefringent Crystals. *I. Synthesis of Lossless Networks of Equal–Length Crystals", Journal of the Optical Society of America (vol. 54, No. 10, pp. 1267–1279, Oct. 1964).

Senior et al., "Devices for Wavelength–Multiplexing and Demultiplexing", IEE Proceedings (vol. 136, Pt. J, No. 3, Jun. 1989).

Nosu et al., "Optical FDM Transmission Technique", Journal of Lightwave Technology (vol. LT–5, No. 9, Sep. 1987) pp. 1301–1307.

(List continued on next page.)

Primary Examiner—Ricky D. Shafer
(74) Attorney, Agent, or Firm—Baker Botts L.L.P.

(57) ABSTRACT

An optical wavelength router separates even and odd optical channels from an input WDM signal. The input beam is first converted into a pair of orthogonally-polarized beams. One of the beams is reflected by a mirror, while the other is reflected by a Fabry-Perot resonator (or etalon). The group delay of the reflected beams is strongly dependent on wavelength. The beams reflected from the resonator and mirror are combined and interfere in a birefringent element (e.g., a beam displacer or polarized beamsplitter) to produce a beam having mixed polarization as a function of wavelength. The polarized components of this beam are separated by a polarization-dependent routing element to produce two output beams containing complementary subsets of the input optical spectrum (e.g., even optical channels are routed to output port A and odd optical channels are routed to output port B).

31 Claims, 16 Drawing Sheets

U.S. PATENT DOCUMENTS

| | | | |
|---|---|---|---|
| 5,155,623 A | | 10/1992 | Miller et al. |
| 5,172,186 A | * | 12/1992 | Hosoe |
| 5,363,228 A | | 11/1994 | DeJule et al. |
| 5,381,250 A | | 1/1995 | Meadows |
| 5,414,541 A | | 5/1995 | Patel et al. |
| 5,488,500 A | | 1/1996 | Glance |
| 5,546,219 A | | 8/1996 | Iida |
| 5,574,595 A | | 11/1996 | Kurata et al. |
| 5,596,661 A | | 1/1997 | Henry et al. |
| 5,606,439 A | | 2/1997 | Wu |
| 5,680,490 A | | 10/1997 | Cohen et al. |
| 5,689,360 A | | 11/1997 | Kurata et al. |
| 5,694,233 A | | 12/1997 | Wu et al. |
| 5,768,005 A | | 6/1998 | Cheng et al. |
| 5,809,190 A | | 9/1998 | Chen |
| 5,818,626 A | | 10/1998 | Engstrom et al. |
| 5,867,291 A | | 2/1999 | Wu et al. |
| 5,912,748 A | | 6/1999 | Wu et al. |
| 5,912,754 A | | 6/1999 | Koga et al. |
| 5,978,116 A | | 11/1999 | Wu et al. |
| 6,028,706 A | * | 2/2000 | Shirasaki et al. |
| 6,130,971 A | * | 10/2000 | Cao |
| 6,144,494 A | | 11/2000 | Shirasaki et al. |
| 6,169,626 B1 | * | 1/2001 | Chen et al. |
| 6,222,958 B1 | * | 4/2001 | Paiam |
| 6,243,200 B1 | * | 6/2001 | Zhou et al. |
| 6,307,677 B2 | * | 10/2001 | Cao |

OTHER PUBLICATIONS

Inoue et al., "A Four–Channel Optical Waveguide Multi/Demultiplexer for 5–Ghz Spaced Optical FDM Transmission", Journal of Lightwave Technology (vol. 6, No. 2, Feb. 1988) pp. 339–345.

Chung et al., "Analysis of a Tunable Multichannel Two–Mode–Interference Wavelength Division Multiplexer/Demultiplexer", Journal of Lightwave Technology (vol. 7, No. 5, May 1989) pp. 766–777.

Damask et al., "Wavelength–Division Multiplexing using Channel–Dropping Filters", Journal of Lightwave Technology (vol. 11, No. 3, Mar. 1993) pp. 424–428.

Dingel and Izutsu, "Multifunction Optical Filter with a Michelson–Gires–Tournois Interferometer for Wavelength–Division–Multiplexed Network System Applications"; Optical Letters (vol. 23, p. 1099–1101, Jul. 1998).

Takato et al., "Silica–Based Integrated Optic Mach–Zehnder Multi/Demultiplexer Family with Channel Spacing of 0.01–250nm," IEEE Journal on Selected Areas in Communications, vol. 8(6), pp. 1120–1127 (Aug. 1990).

Verbeek et al., "Integrated Four–Channel Mach–Zehnder Multi/Demultiplexer Fabricated with Phosphorous Doped SIO2 Waveguides on Si," Journal of Lightwave Technology (vol. 6, No. 2, Jun. 1988).

* cited by examiner

From Fig. 13

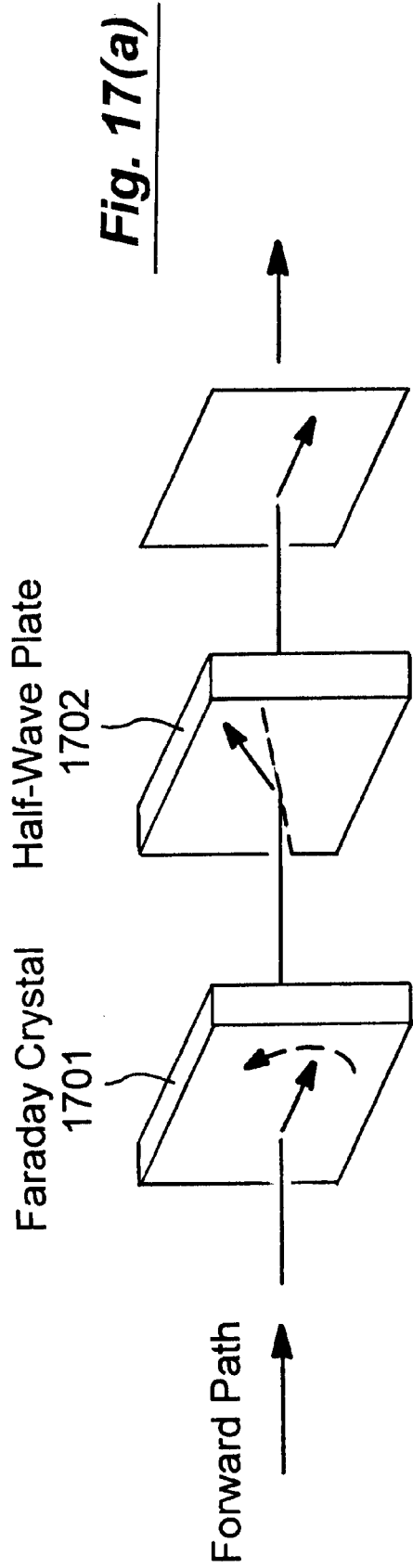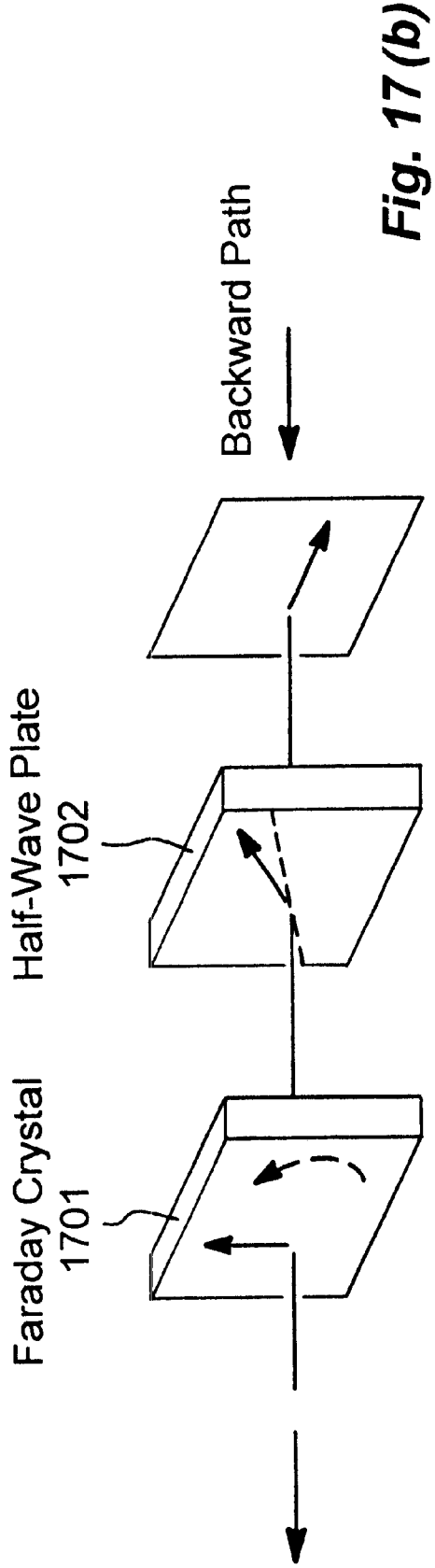
Fig. 17(a)
Fig. 17(b)

COMPACT TUNABLE OPTICAL WAVELENGTH INTERLEAVER

RELATED APPLICATIONS

The present application is a continuation-in-part of the Applicants' U.S. patent application Ser. No. 09/547,812, entitled "Optical Wavelength Router Based On Polarization Interferometer," filed on Apr. 11, 2000, now U.S. Pat. No. 6,243,200, issued on Jun. 5, 2001, which is based on U.S. Provisional Patent Application Ser. No. 60/186,314, filed on Mar. 2, 2000. The present application is also a continuation-inpart of Applicants' U.S. patent application Ser. No. 09/391,733, entitled "Apparatus For Wavelength Demultiplexing Using A Multi-Cavity Etalon," filed on Sep. 8, 1999, now U.S. Pat. No. 6,208,444, issued on Mar. 27, 2001, which is a continuation-inpart of U.S. patent application Ser. No. 09/274,270, filed on Mar, 22, 1999, now U.S. Pat. No. 6,163,393, issued on Dec. 19, 2000, which is a continuation-in-part of U.S. patent application Ser. No. 09/240,550, filed on Jan. 29, 1999, now U.S. Pat. No. 5,978,116, issued on Nov. 2, 1999, which is a continuation of U.S. patent application Ser. No. 08/739,424, filed on Oct. 29, 1996, now U.S. Pat. No. 5,867,291, issued on Feb. 2, 1999.

BACKGROUND OF THE INVENTION

1. Field of the Invention

The present invention relates generally to the field of optical communications systems. More specifically, the present invention discloses an optical wavelength router for wavelength division multiplex (WDM) optical communications.

2. Statement of the Problem

Wavelength division multiplexing is a commonly used technique that allows the transport of multiple optical signals, each at a slightly different wavelength, over an optical fiber. The ability to carry multiple signals on a single fiber allows that fiber to carry a tremendous amount of traffic, including data, voice, and even digital video signals. As an example, the use of wavelength division multiplexing permits a long distance telephone company to carry thousands or even millions of phone conversations on one fiber. By using wavelength division multiplexing, it is possible to effectively use the fiber at multiple wavelengths, as opposed to the costly process of installing additional fibers.

In wavelength division multiplexing techniques, multiple wavelengths can be carried within a specified bandwidth. It is advantageous to carry as many wavelengths as possible in that bandwidth. International Telecommunications Union (ITU) Draft Recommendation G.mcs, incorporated herein by reference, proposes a frequency grid which specifies various channel spacings including 100 GHz and 200 GHz. It would be advantageous to obtain 50 GHz spacing. Separating and combining wavelengths with these close spacings requires optical components which have high peak transmission at the specified wavelengths and which can provide good isolation between separated wavelengths.

One technique which has been developed to accomplish the demultiplexing of closely spaced wavelengths is to cascade a series of wavelength division demultiplexing devices, each device having different wavelength separating characteristics. A typical application involves cascading an interferometric device such as an arrayed waveguide device having a narrow spacing of transmission peaks (e.g., 50 GHz) with a second interferometric device which has a coarser spacing and correspondingly broader transmission peaks (e.g., 100 GHz spacing). The cascade of devices provides the required separation of wavelengths by subdividing the wavelengths once in the first device, typically into a set of odd and even channels, and then separating wavelengths in the subsets in following devices in the cascade.

Arrayed waveguide, fused biconical taper, fiber Bragg grating, diffraction grating, and other interferometric wavelength demultiplexing devices can be constructed to have the appropriate characteristics for the first or second stage devices in the cascade. However, traditional interferometric devices have the characteristic that as the spacing of the channels is decreased, the transmission peaks become narrower, and are less flat over the wavelength region in the immediate vicinity of each peak than a device with wider channel spacings. As a result, when using a traditional device in the first stage of a cascade, the transmission peaks may not have a high degree of flatness, and any drift or offset of a wavelength from its specified value may result in significant attenuation of that wavelength. In addition, the isolation between wavelengths is frequently unsuitable with conventional interferometric devices and can result in unacceptable cross-talk between channels.

With increasing numbers of wavelengths and the close wavelength spacing which is utilized in dense wavelength division multiplexing systems, attenuation and cross-talk must also be closely controlled to meet the system requirements and maintain reliable operations. As an example, 40 or 80 wavelengths can be generated using controllable-wavelength lasers, with transmission signals modulated onto each laser. It is desirable to be able to demultiplex these channels. Although the lasers can be controlled and the wavelengths stabilized to prevent one channel from drifting into another, there is always some wavelength drift which will occur.

For the foregoing reasons, there is a need for a wavelength division demultiplexing device which tolerates wavelength drift, maintains a high degree of isolation between channels, and is able to separate large numbers of wavelengths.

3. Prior Art

FIG. 1 illustrates a prior art interferometer that shares some of the basic principles employed in the present invention. An input laser beam is split into two beams by a beamsplitter 10. One beam propagates toward a mirror 14 and is reflected back by this mirror. The other beam propagates toward a resonator 12 and is also reflected back. The resonator 12 is a Fabry-Perot cavity (or etalon) with a partially-reflective front mirror and a totally-reflective back mirror. The resonator 12 reflects substantially all of the incident optical power back regardless of wavelength, but the group delay of the reflected light is strongly dependent on wavelength. The two reflected beams from the mirror 14 and from the resonator 12 interfere at the beamsplitter 10 and the resulting output is split into two beams, one at output A, and the other in a different direction at output B. The two output beams contain complementary subsets of the input optical spectrum, as shown for example in FIG. 2. Such a wavelength router concept has been proposed by B. B. Dingle and M. lzutsu, "Multifunction Optical Filter With A Michelson-Gires-Tournois Interferometer For Wavelength-Division-Multiplexed Network System Applications," *Optics Letters*, vol. 23, p. 1099 (1998) and the references therein.

The two output ports A and B divide the spectral space evenly with alternating optical channels being directed to each output port (i.e., optical channels 1, 3, 5, 7, etc. are directed to output port A, while channels 2, 4, 6, etc. are directed to output port B). This function has sometimes been called an optical interleaver.

4. Solution to the Problem

The present invention address the problems associated with the prior art using a polarization-based interferometer to implement an optical interleaver capable of separating closely spaced optical channels with minimal cross-talk.

SUMMARY OF THE INVENTION

This invention provides a method and apparatus for optical wavelength routing in which an input beam is converted to a pair of orthogonally-polarized beams. A split-mirror resonator has a front mirror with two regions having different reflectivities, and a reflective back mirror spaced a predetermined distance behind the front mirror. Each of the orthogonally-polarized beams is incident on a corresponding region of the front mirror of the resonator. A portion of each beam is reflected by the front mirror, while the remainder of the beam enters the resonator cavity where it is reflected by the back mirror back through the front mirror. The group delay of each reflected beam is strongly dependent on wavelength. The two reflected beams from the resonator are combined and interfere in a birefringent element (e.g., a beam displacer or waveplates) to produce a beam having mixed polarization as a function of wavelength. The polarized components of this beam are separated by a polarization-dependent routing element (e.g., a polarized beamsplitter) to produce two output beams containing complementary subsets of the input optical spectrum (e.g., even optical channels are routed to output port A and odd optical channels are routed to output port B).

Alternatively, the split-mirror resonator can be replaced by a mirror and Fabry-Perot resonator. In this embodiment, one of the orthogonally-polarized beams is reflected by the mirror, while the other is reflected by the Fabry-Perot resonator.

These and other advantages, features, and objects of the present invention will be more readily understood in view of the following detailed description and the drawings.

BRIEF DESCRIPTION OF THE DRAWINGS

The present invention can be more readily understood in conjunction the accompanying drawings, in which:

FIGS. 17(a) and 17(b) are diagrams illustrating operation of the Faraday rotator 1105 in the forward and reverse directions, respectively.

DETAILED DESCRIPTION OF THE INVENTION

Figure 3:
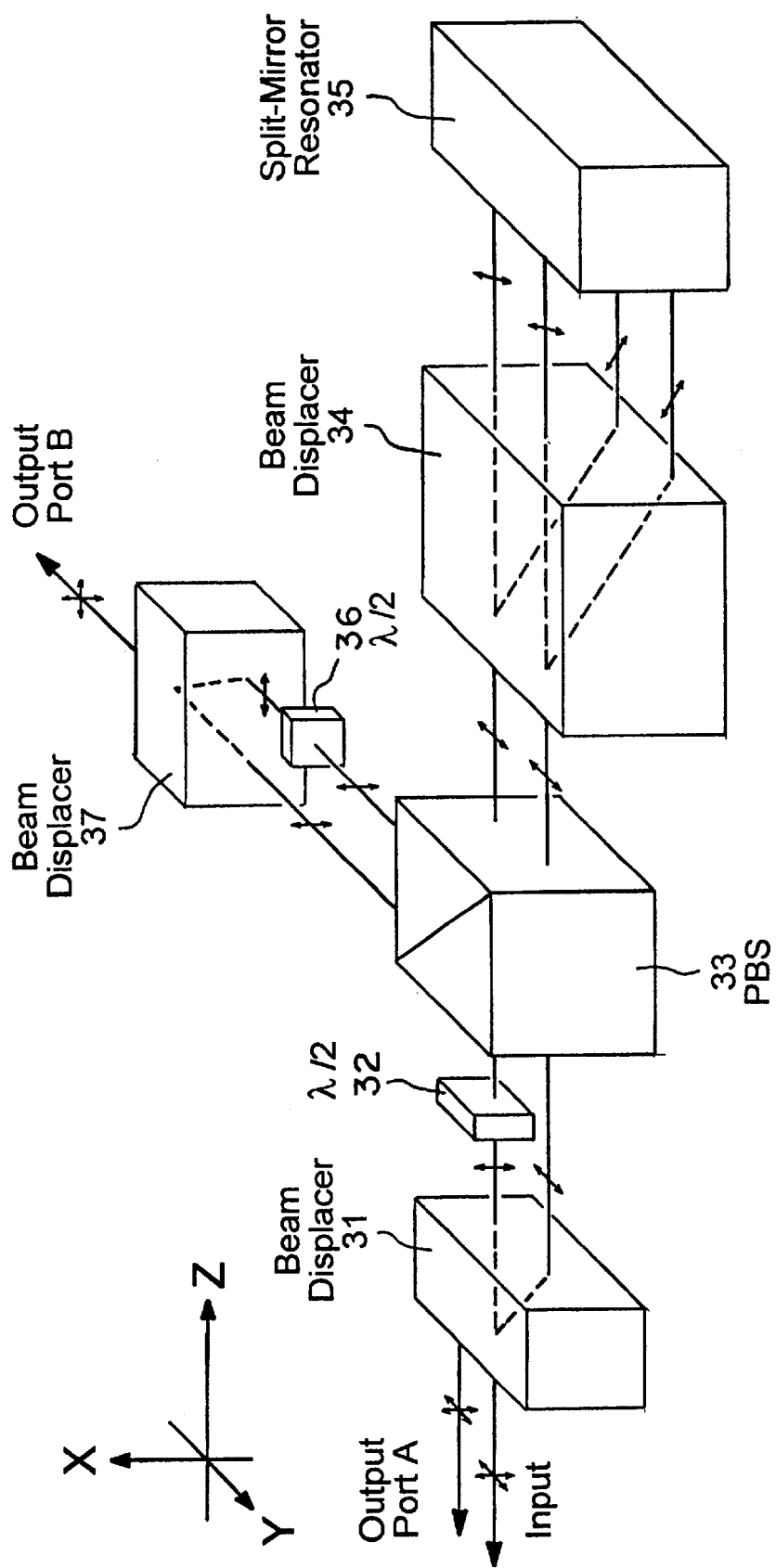
FIG. 3 is a diagram of an optical wavelength router embodying the present invention.

FIG. 3 is a diagram showing a one implementation of the present optical wavelength router based on a polarization interferometer. A collimated beam from an optical fiber propagates along the Z axis and is incident into the first beam displacer 31. For example, a birefringent element consisting of a material such as calcite, rutile, lithium niobate, $YVO_4$-based crystals, and the like could be used as the beam displacers in the present invention. The first beam displacer 31 splits the input beam into two beams having orthogonal polarizations (e.g., along the X and Y directions, respectively). A half-wave plate ($\lambda/2$) 32 rotates the polarization of one of these beams by 90 degrees, so that both beams have the same polarization. For example, both beams exiting the half-wave plate 32 in FIG. 3 are polarized along the Y axis.

Both beams then pass through a polarized beamsplitter (PBS) 33 without significant attenuation. A second beam displacer 34 splits the Y-polarized beam pair into two pairs of beams that are orthogonally polarized in the XY plane. One pair of these beams is polarized at 45 degrees relative to the X axis, while the other pair is polarized at 135 degrees relative to the X axis. The two pairs of beams are incident onto and reflected by a split-mirror resonator (SMR) 35.

Figure 4A:
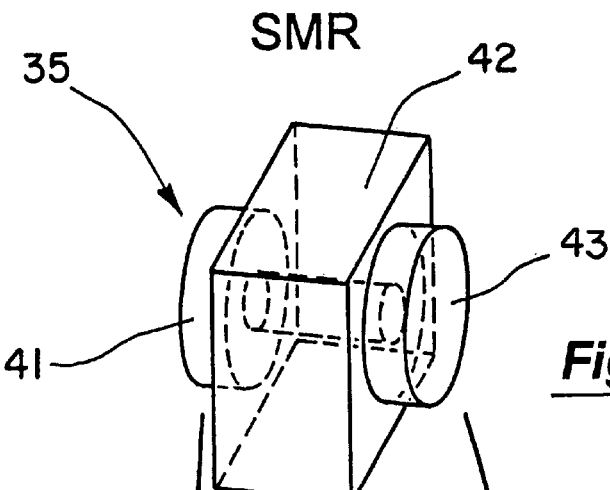
FIG. 4(a) is a detail perspective view of the split-mirror resonator in FIG. 3.
Figure 4B:
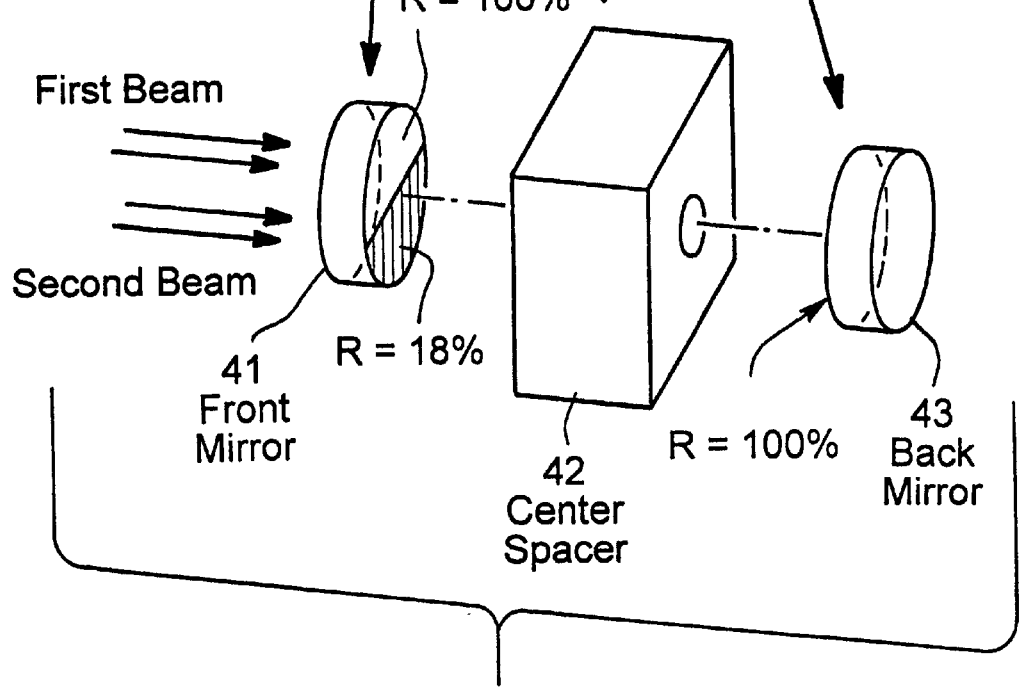
FIG. 4(b) is an exploded view of the components of the split-mirror resonator corresponding to FIG. 4(a).

FIGS. 4(a) and 4(b) show the structure of the split mirror resonator 35 in FIG. 3. The resonator 35 is formed by a front mirror 41 and a back mirror 43 separated a predetermined distance by a center spacer 42. The front mirror 41 is a split mirror in which part of the surface is coated with a high-reflectivity coating and part of the surface is only partially reflective (e.g., 18% reflectivity). The degree of reflectivity of both regions is a matter of design. For example, the high-reflectivity region can be 100% reflective, or only partially reflective so long as it is more reflective than the other region of the front mirror 41. For example, this can be accomplished by applying a split coating to the front mirror 41. The second mirror 43 has a high reflectivity.

Returning to FIG. 3, the second beam displacer 34 produces two pairs of orthogonally-polarized beams. The first beam pair strikes the highly-reflective region of the front mirror 41 and is largely reflected back along the Z axis to the second beam displacer 34 without propagating through the resonator 35. In contrast, the second beam pair strikes the partially-reflective region of the front mirror 41 and is partially transmitted through the front mirror 41 into the resonator cavity between the front and back mirrors 41 and 43. A portion of the second beam pair is also reflected back along the Z axis to the second beam displacer 34 without propagating through the resonator 35. The transmitted portions of the first and second beam pairs are reflected by the back mirror 43 through the front mirror 41 of the resonator 35 toward the second beam displacer 34. The split-mirror resonator 35 reflects substantially all of the incident optical power back regardless of wavelength, but the group delay of the reflected beams is strongly dependent on wavelength.

Thus, both pairs of reflected beams from the split mirror resonator 35 back-propagate along the negative Z axis (moving toward the left in FIG. 3) and are recombined into one pair of beams by the second beam displacer 34. Due to the birefringence of the second beam displacer 34, a difference in the optical path lengths between the two beam pairs is generated. As a result, the polarization state of the back-propagating beam pair exiting the second beam displacer 34 is a function of optical wavelength. In other words, this back-propagating beam pair has mixed polarization as a function of the optical wavelengths carried by the beams.

The back-propagating beam pair enters the polarized beamsplitter 33. The components of the beam pair that are polarized along the Y axis are transmitted through the polarized beamsplitter 33 toward the first beam displacer 31, while those components that are polarized along the X axis are reflected by the polarized beamsplitter 33 toward a third beam displacer 37, as illustrated in FIG. 3. It should be expressly understood that other types of polarization-dependent routing elements could be employed to separate the components of the back-propagating beam pair. For example, an angled beamsplitter, beam displacer, or other birefringent element could substituted for this purpose.

One of the beams in the transmitted beam pair passes through the half-wave plate 32 which rotates its polarization by 90 degrees, so that the transmitted beams have orthogonal polarizations. These beams are then recombined by the first beam displacer 31 into a single beam at output port A. Similarly, one of the beams in the reflected beam pair passes through a half-wave plate 36 which rotates its polarization by 90 degrees, so that the reflected beams become orthogonally polarized. These beams are recombined by the third beam displacer 37 into a single beam at output port B.

Figure 1:
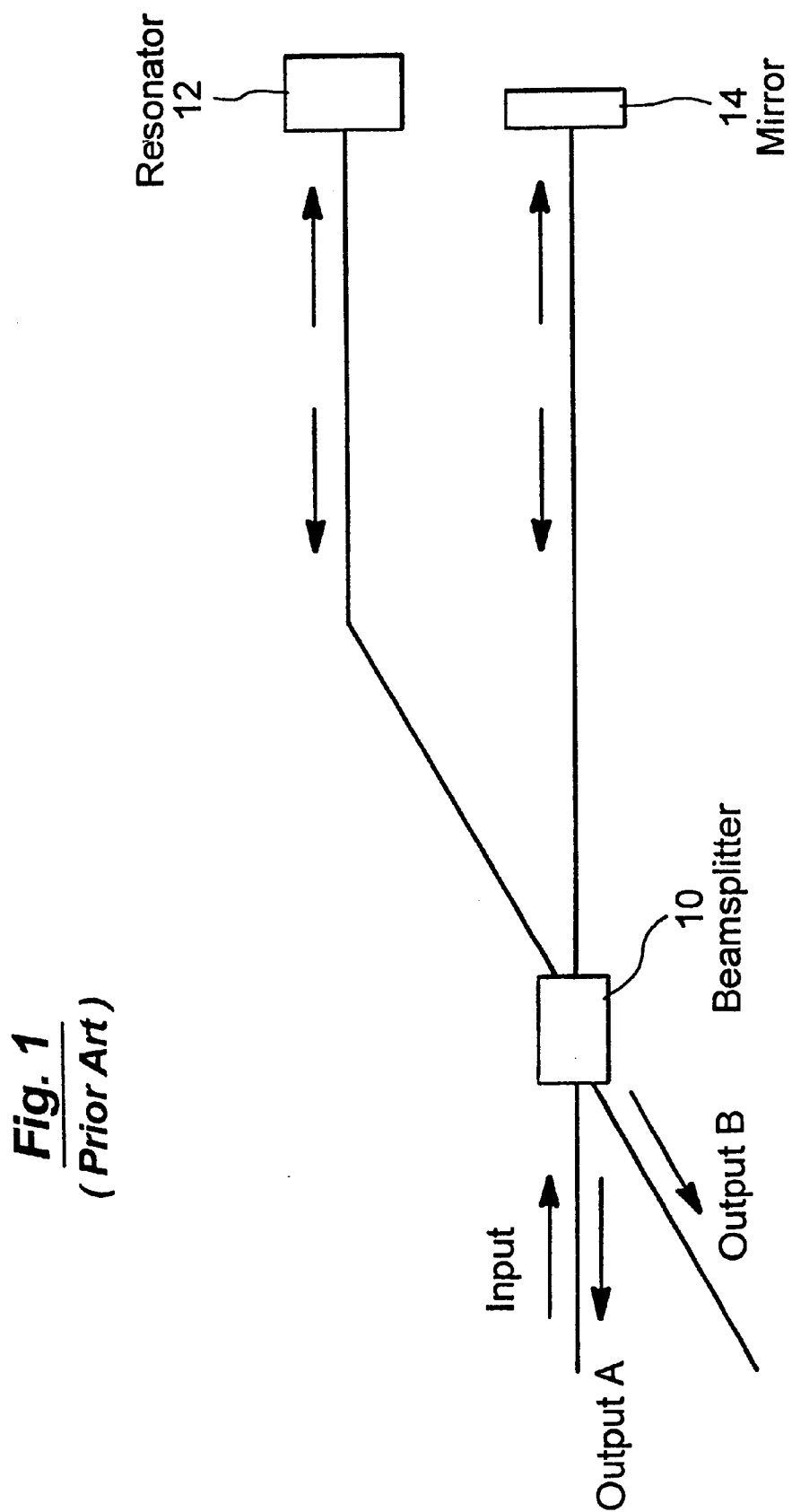
FIG. 1 is a simplified diagram of a prior art interferometer using a beamsplitter and Fabry-Perot resonator.
Figure 2:
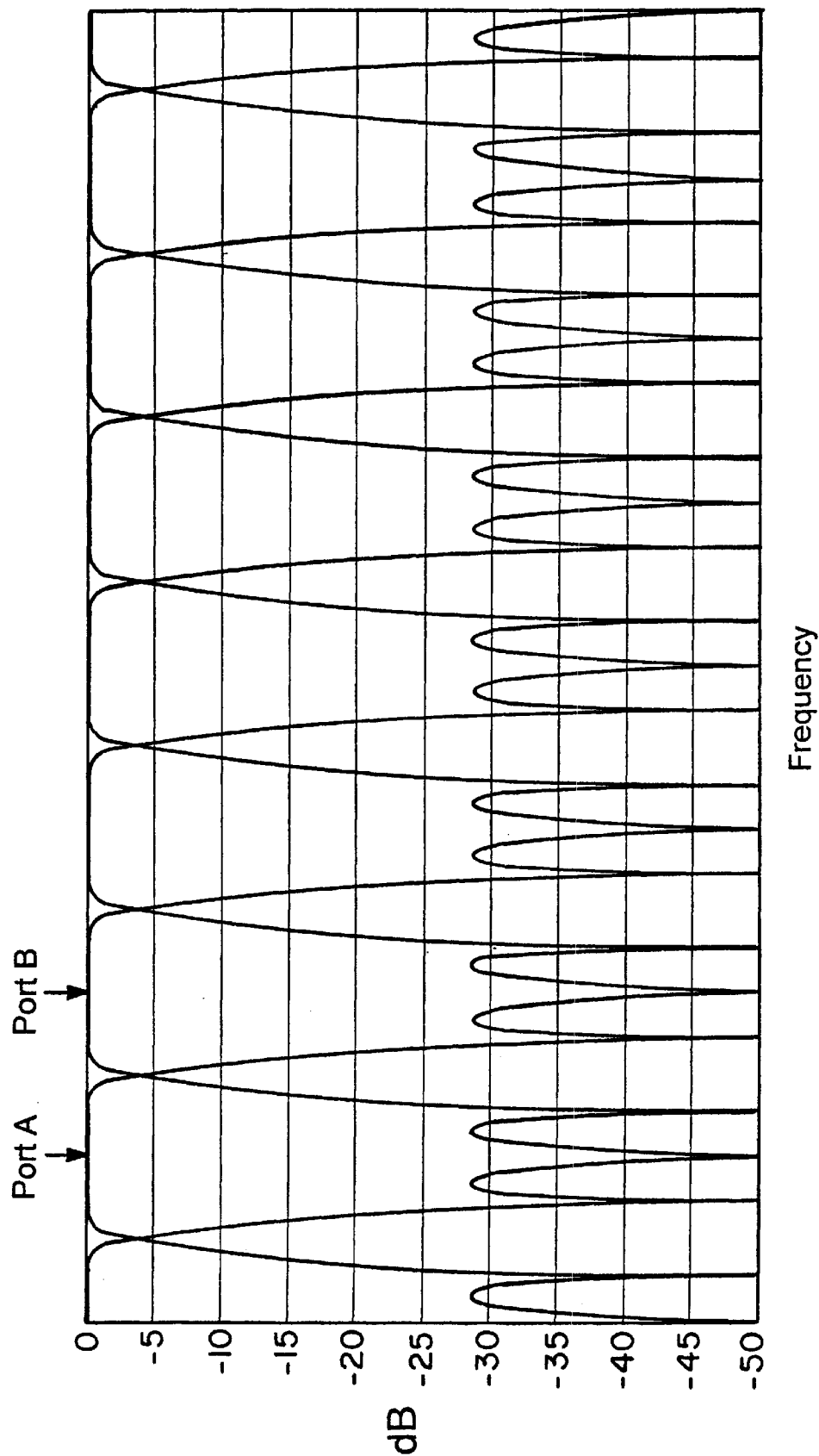
FIG. 2 is a graph showing an example of the spectral response of the interferometer in FIG. 1.

Thus, this device functions as an optical interleaver. The outputs beams at output ports A and B contain two complementary subsets of the input optical spectrum, similar to those shown in FIG. 2, with alternating optical channels in the input spectrum being routed to each output port. If desired, this device can be extended in a cascade architecture with multiple stages of optical interleavers to progressively separate individual channels or groups of channels.

The embodiment of the split-mirror resonator shown in FIGS. 4(*a*) and 4(*b*) has advantages in certain applications. This embodiment can decrease the device size. More importantly, it allows the two beam pairs to share a common path, thereby minimizing the effects of vibration, air turbulence, and temperature change.

Figure 5A:
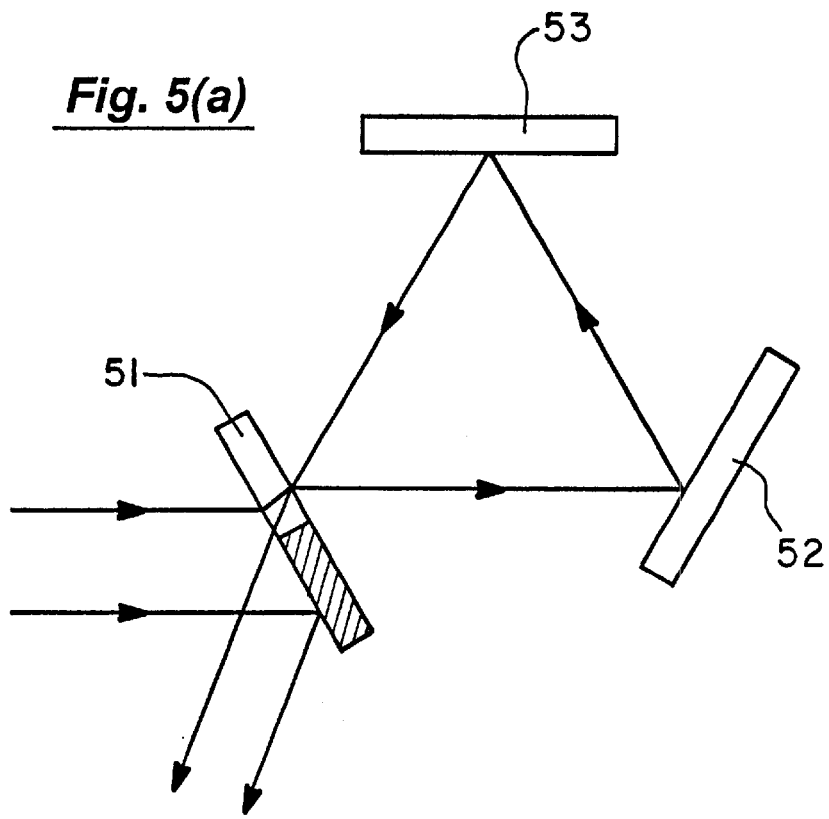
FIG. 5(a) diagram of an alternative embodiment of a split-mirror resonator using three mirrors in a ring configuration.
Figure 5B:
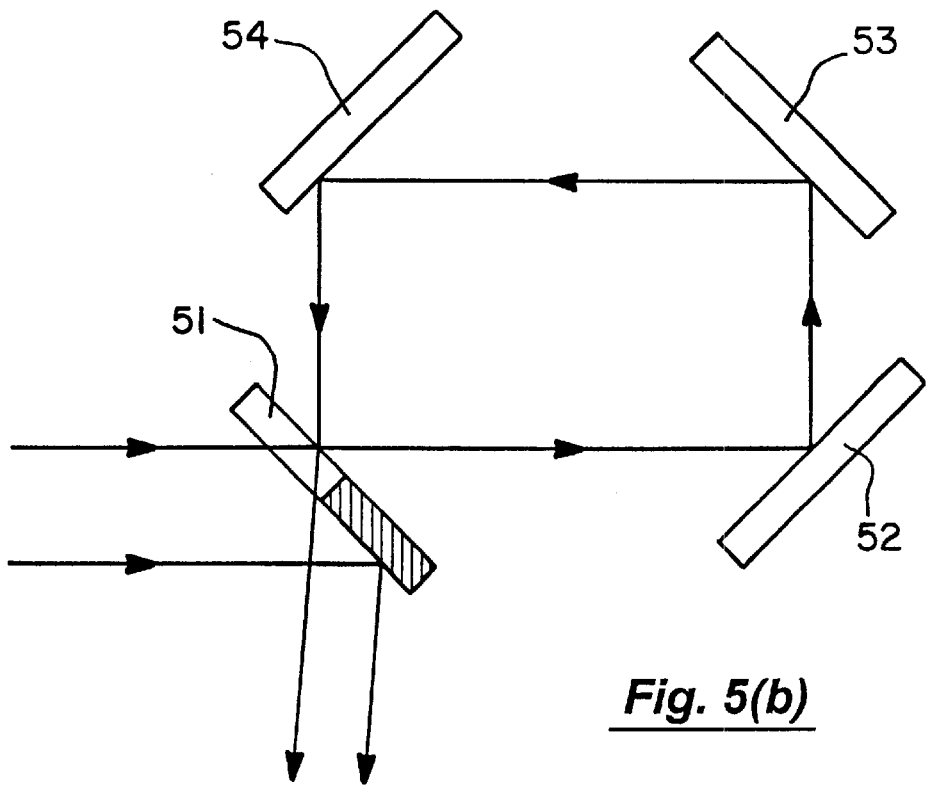
FIG. 5(b) is a diagram of another alterative embodiment of a split-mirror resonator using four mirrors in a ring configuration.

Ring-Shaped Resonator Structures. Alternatively, the split-mirror resonator can be implemented as a ring structure with more than two mirrors. For example, FIG. 5(*a*) shows a resonator with three mirrors 51, 52, and 53. Here, the first mirror 51 is a split mirror, similar to the example shown in FIG. 4(*b*). The other mirrors 52 and 53 are coated with a high reflectance coating. FIG. 5(*b*) extends this concept to a resonator with four mirrors 51–54 in a ring structure.

Figure 6:
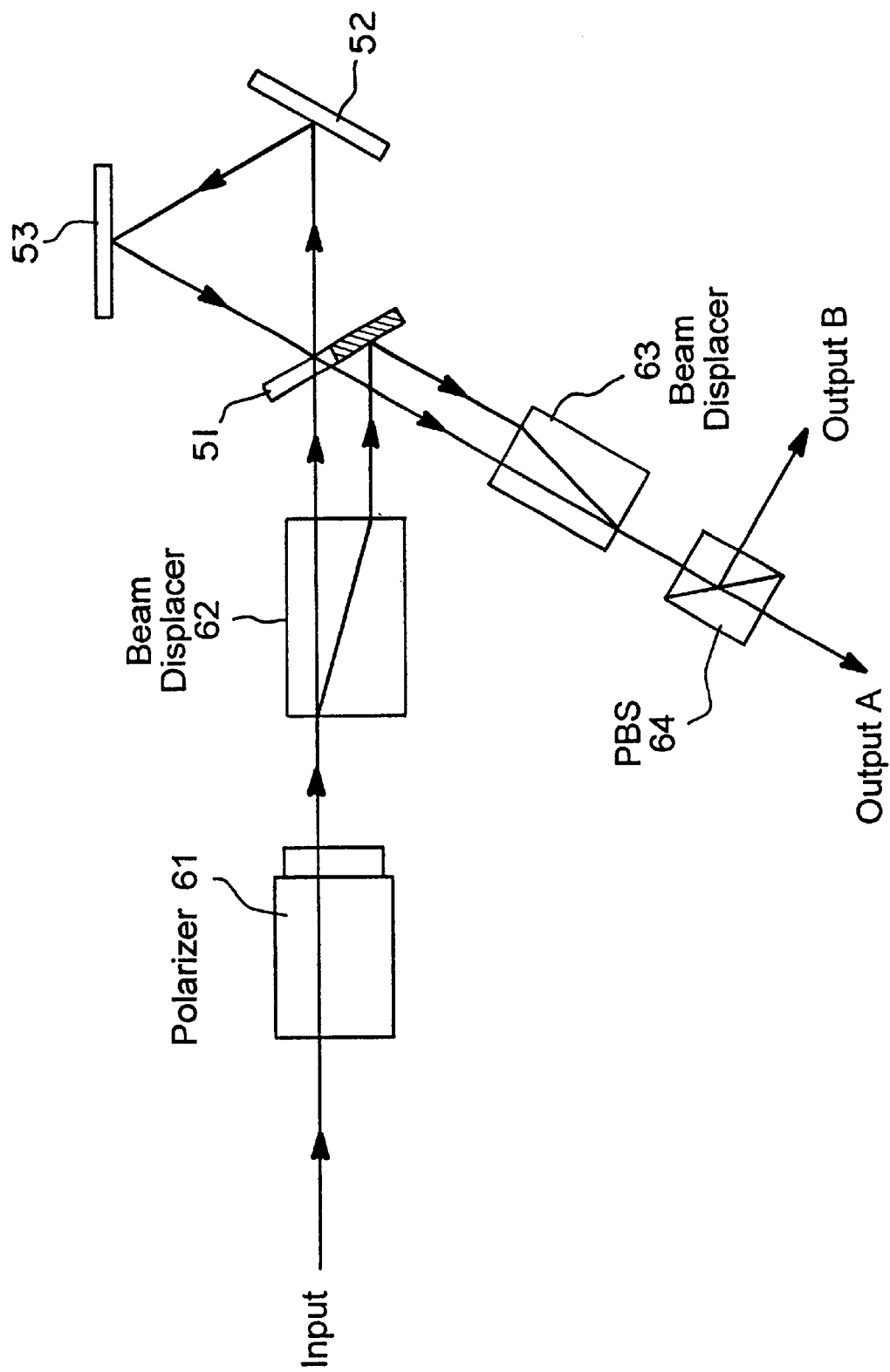
FIG. 6 is a diagram of an alternative embodiment of the optical wavelength router using the ring resonator from FIG. 5(a).

FIG. 6 shows an alternative embodiment of an optical wavelength router using the ring resonator structure from FIG. 5(*a*). The input optical signal passes through a polarizer 61 that converts the random polarization of the input beam to a known linear polarization. For example, the polarizer 61 can be implemented as a birefringent element 31 and half-wave plate 32 as shown in FIG. 3 that converts the input beam into a pair of beams having the same polarization. Alternatively a simple polarization filter can be employed to produce a single polarized beam as shown in FIG. 6.

The same applies for all of the other embodiments described this application, in that a polarization filter can be used as the polarizer in place of the combination of birefringent element and half-wave plate at the input port. This substitution removed the need for birefringent elements and half-wave plates at each output port, thereby reducing costs. In addition, a simple polarization filter produces only one polarized beam from the input beam, which tends to simplify design of the optical paths through the wavelength router. However, a polarization filter may be less efficient in transmitting all of the available optical energy of the input beam.

The polarized beam is then separated into two orthogonally-polarized beams by a first beam displacer 62. As before, one of these beams strikes the highly reflective region of the first mirror 51 and is reflected to the second beam displacer 63. The other beam passes through the partially reflective region of the first mirror 51 and is reflected in turn by the second and third mirrors 52 and 53 before being reflected back through the first mirror 51 toward the second beam displacer 63. The beams exiting the ring resonator 51–53 are combined by the second beam displacer 63. Here, again, the difference in the optical path lengths between the beams due to the birefringence of the first beam displacer 62 and the second beam displacer 63 produces interference between the beams and results in an output beam having a polarization state that is a function of optical wavelength. A polarized beamsplitter 64 (or other polarization-dependent routing element) separates the polarized components of the output beam from the second beam displacer 63 to output ports A and B, respectively, to produce two complementary subsets of the input optical spectrum, similar to those shown in FIG. 2.

Figure 7:
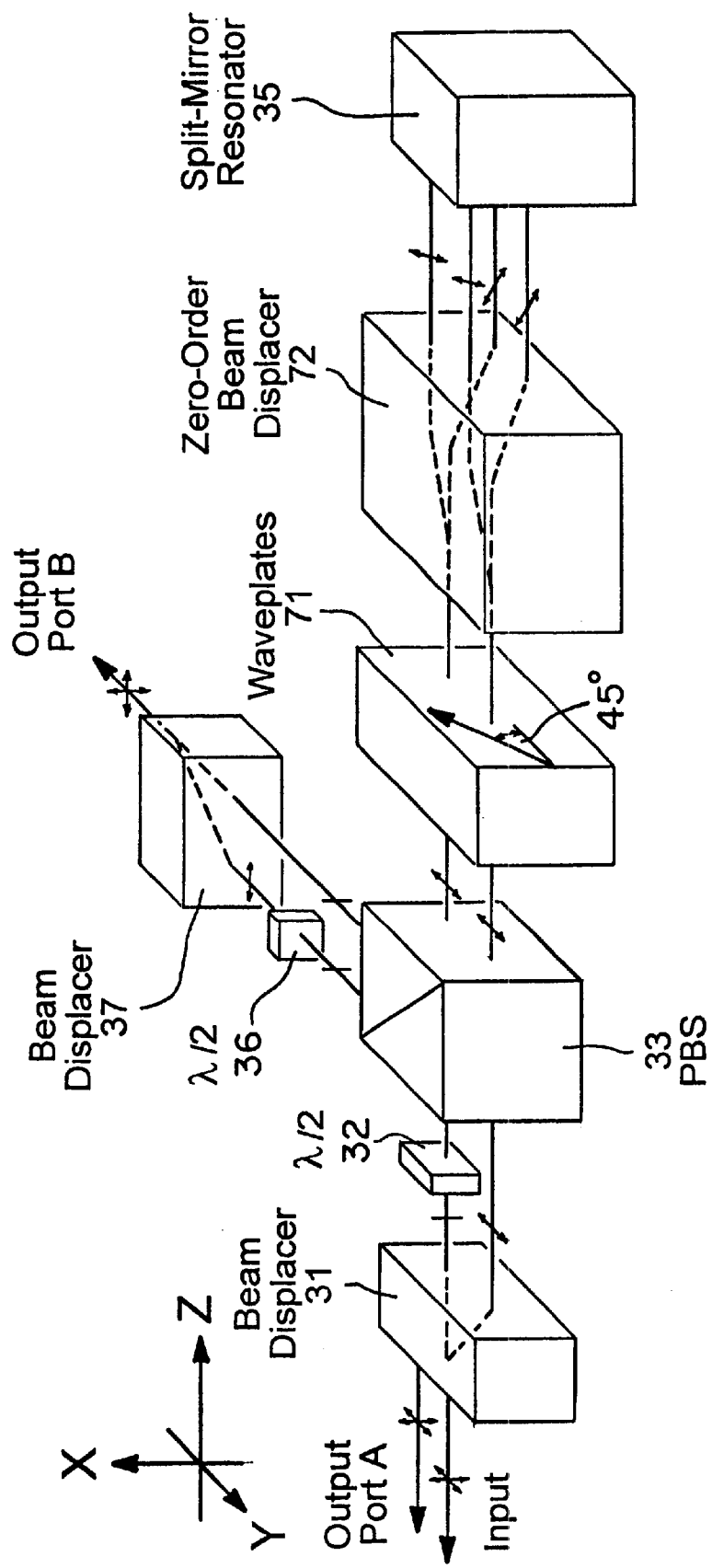
FIG. 7 a diagram of another embodiment of the optical wavelength router.

Wavelength Router Using Waveplates and a Zero-Order Beam Displacer. FIG. 7 shows another embodiment of the present optical wavelength router. In this device, one or more waveplates 71 are used to generate birefringence and thereby produce a predetermined difference in the optical path lengths between different optical polarizations. The waveplates 71 are oriented such that the optical axis for each one is at 45 degrees relative to the polarizing axis of the beamsplitter 33. However, the waveplates 71 do not disturb the net beam propagation direction. The waveplates 71 can be one piece of birefringent material oriented at 45 degrees, or a plurality of birefringent elements that are all oriented at 45 degrees.

The first beam displacer 31 splits the input beam into two orthogonally-polarized beams. A half-wave plate 32 rotates the polarization of one of these beams by 90 degrees, so that both beams have the same polarization. Both beams then pass through a polarized beamsplitter 33 without significant attenuation. The waveplates 71 cause a 50/50 split of the incident optical power of both beams into two orthogonal polarizations as a result of the 45 degree orientation of the waveplates' axis. After the waveplates 71, a second beam displacer 72 spatially separates the two orthogonal polarizations in the beam pair to create two pairs of beams as illustrated in FIG. 7.

A split-mirror resonator 35, as describe above and shown in FIGS. 4(*a*) and 4(*b*), reflects both beams pairs beams back along the negative Z axis so that they are recombined into one pair of beams by the second beam displacer 72. Due to the birefringence of the waveplates 71, a difference in the optical path lengths between the orthogonally polarized beams is generated. As a result, the polarization state of the back-propagating beam pair exiting the waveplate 71 is a function of optical wavelength.

The back-propagating beam pair enters the polarized beamsplitter 33 (or other polarization-dependent routing element). The components of the beam pair that are polarized along the Y axis are transmitted through the polarized beamsplitter 33 toward the first beam displacer 31, while those components that are polarized along the X axis are reflected by the polarized beamsplitter 33 toward a third beam displacer 37. One of the beams in the transmitted beam pair passes through a half-wave plate 32 that rotates its polarization by 90 degrees, so that the transmitted beams have orthogonal polarizations. These beams are then recombined by the first beam displacer 31 into a single beam at output port A. Similarly, one of the beams in the reflected beam pair passes through a half-wave plate 36 that rotates its polarization by 90 degrees, so that the reflected beams become orthogonally polarized. These beams are recombined by the third beam displacer 37 into a single beam at output port B.

Figure 8:
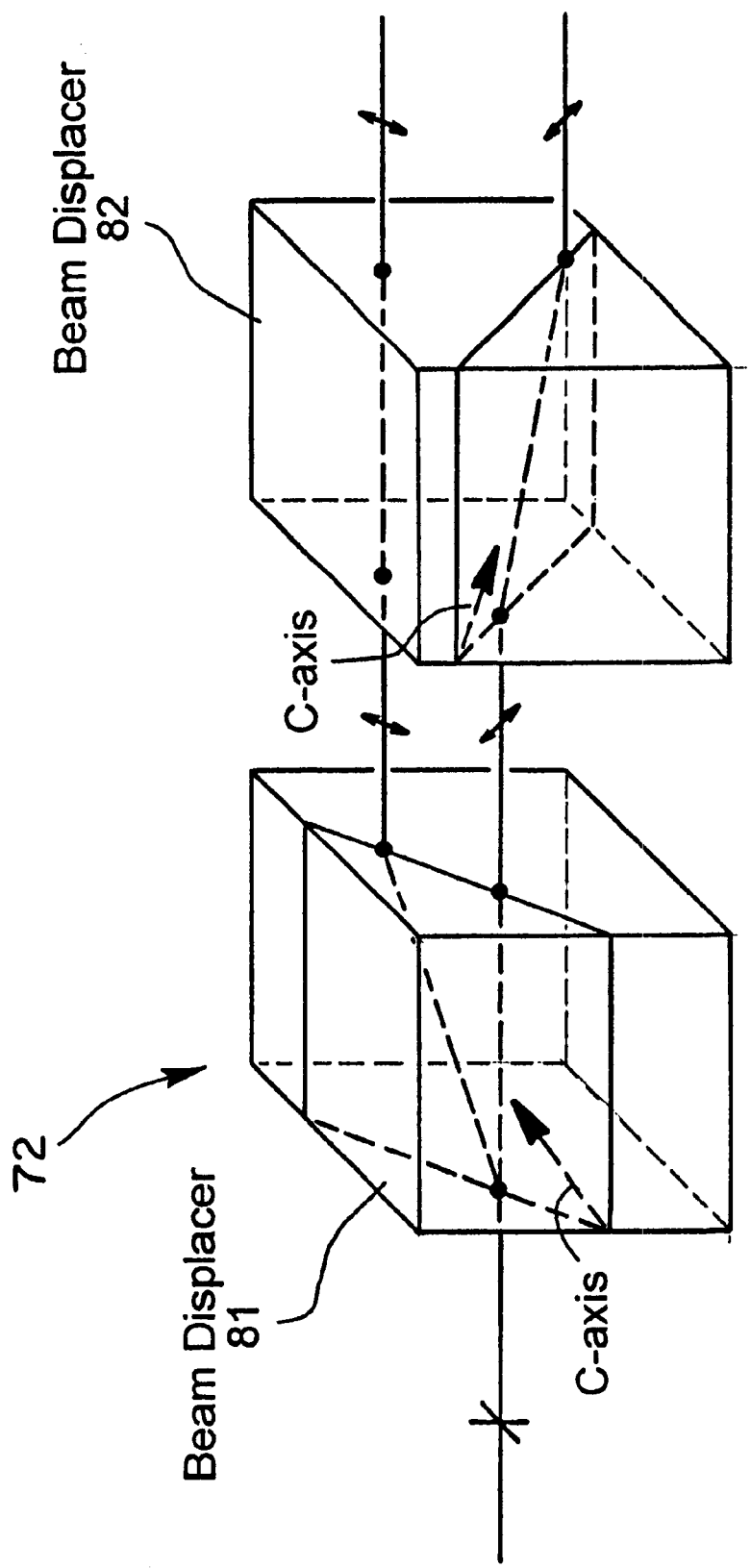
FIG. 8 is isometric view of one embodiment of the zero-order beam displacer shown in FIG. 7.

The second beam displacer 72 in FIG. 7 is preferably constructed as shown in greater detail in FIG. 8. Two beam displacers 81 and 82, made of similar materials and having similar thicknesses, are aligned so that their optical axes are oriented at a predetermined angle (e.g., 90 degrees) relative to one another as shown in FIG. 8. The two beam displacers 81, 82 are then bonded together to form one piece. When an optical beam passes through this assembly, the two input polarizations are spatially separated, but there is no net difference in the optical path lengths through the beam displacers 81 and 82 between the two polarizations. In other words, FIG. 8 demonstrates a "pure" beam displacer (i.e., a zero-order beam displacer), in which the orthogonal input polarizations are spatially separated but at most only a negligible amount of birefringence is added to the beams.

Figure 9:
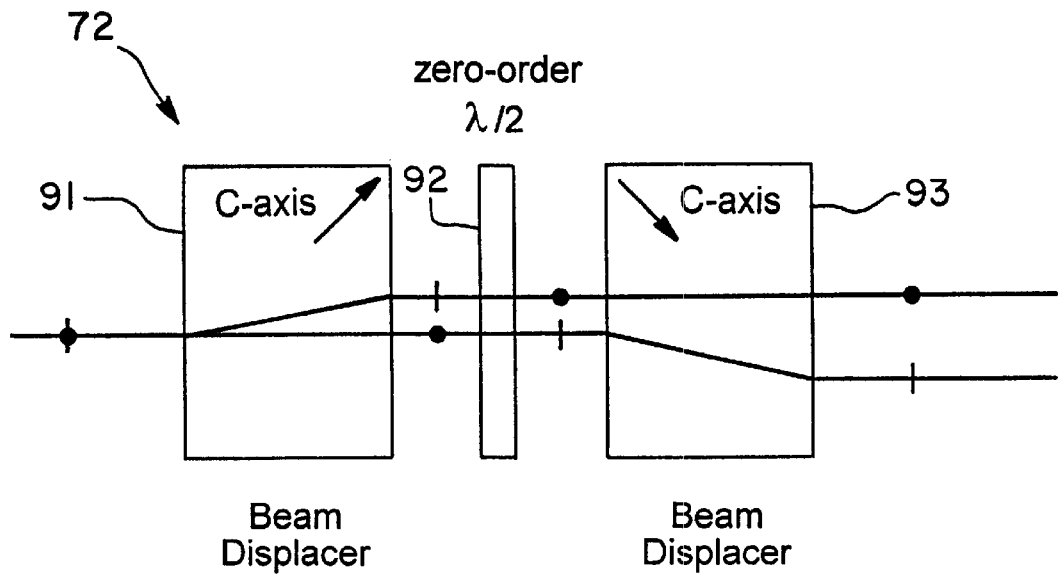
FIG. 9 is side view of a second embodiment of the zero-order beam displacer shown in FIG. 7.
Figure 10:
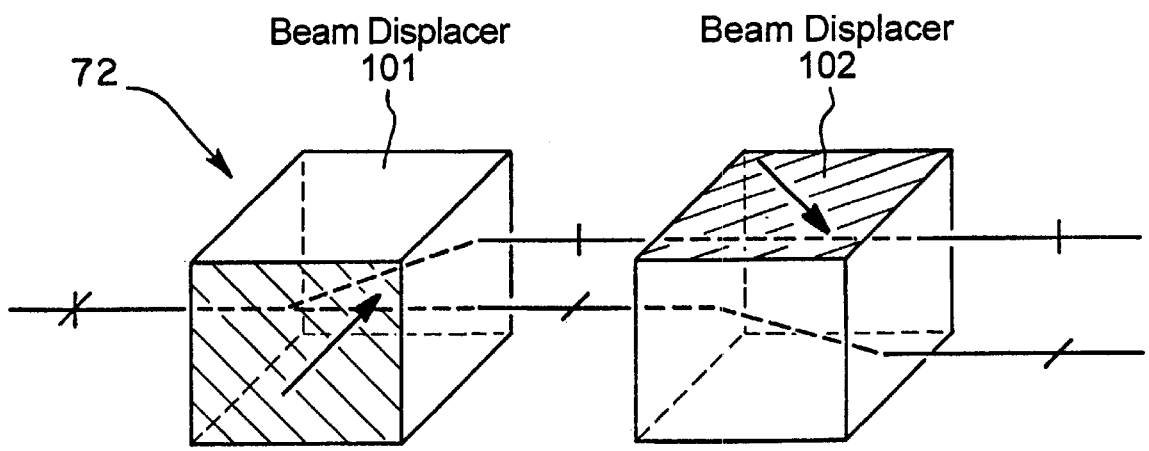
FIG. 10 an isometric view of another embodiment of the zero-order beam displacer shown in FIG. 7.

A zero-order beam displacer can also be implemented as depicted in FIG. 9. Here, a zero-order half-wave plate 92 is placed between beam displacers 91 and 93. The two displacers 91, 93 can be identical pieces but have their respective optical axes rotated by a predetermined amount (e.g., 90 degrees) from one another as shown in FIG. 9. FIG. 10 shows another arrangement to construct a zero order displacer with two identical pieces of conventional displacer using a different crystal orientation.

The embodiment illustrated in FIG. 7 is of practical importance because of the reduced difficulty of optical alignment. In general, either a waveplate or beam displacer can be used to generate birefringence in an optical beam. However, the birefringence of a conventional beam displacer is very sensitive to its orientation. To achieve a given amount of path delay between two polarizations, the position of a conventional displacer must be controlled to within very tight tolerances, making it difficult to initially align and to maintain proper alignment over a range of operating conditions, including temperature changes and mechanical vibration.

In contrast to a beam displacer, the amount of birefringence from a waveplate is much less sensitive to its orientation. There are two reasons for this difference in sensitivity. In a conventional beam displacer as used in FIG. 3, the optical beam usually propagates at about 45 degrees from the optical axis of the crystal. In this configuration, the index of refraction of the extraordinary beam is very sensitive to the exact angle between propagation direction and the optical axis. In a waveplate, the optical beam propagates at 90 degrees from the optical axis. In this configuration, the index of refraction of the extraordinary beam is relatively insensitive to the angle between the propagation direction and the optical axis. The second reason is that in a beam displacer, the ordinary and extraordinary rays exit the crystal with a spatial separation. When the crystal is tilted, the physical distance between the ordinary ray and the extraordinary ray travel become different. In contrast, the physical distances that the ordinary ray and extraordinary ray travel in a waveplates remain almost unchanged.

These two effects combine to make the embodiment of the present invention shown in FIG. 3 much more sensitive to the perturbations to the position of the beam displacer 34. In contrast, the implementation shown in FIG. 7 using waveplates 71 as the interferometer is very robust.

In addition to the advantages associated with waveplates 71, the zero-order displacer 72 introduces at most a negligible amount of birefringence and is therefore easy to initially align and to maintain alignment. In the device shown in FIG. 7, the waveplates 71 can be easily tuned to achieve a desire amount of birefringence and optical path length difference. Such a design makes it possible to produce a compact, reliable, and low-cost wavelength router for WDM communications. The zero-order displacer can further be used to implement a beam displacer with at most negligible inherent differential group delay (DGD). Such zero-DGD displacers also have zero polarization mode dispersion (PMD) and is a very important feature for wavelength routers and other optical communications devices.

Figure 11:
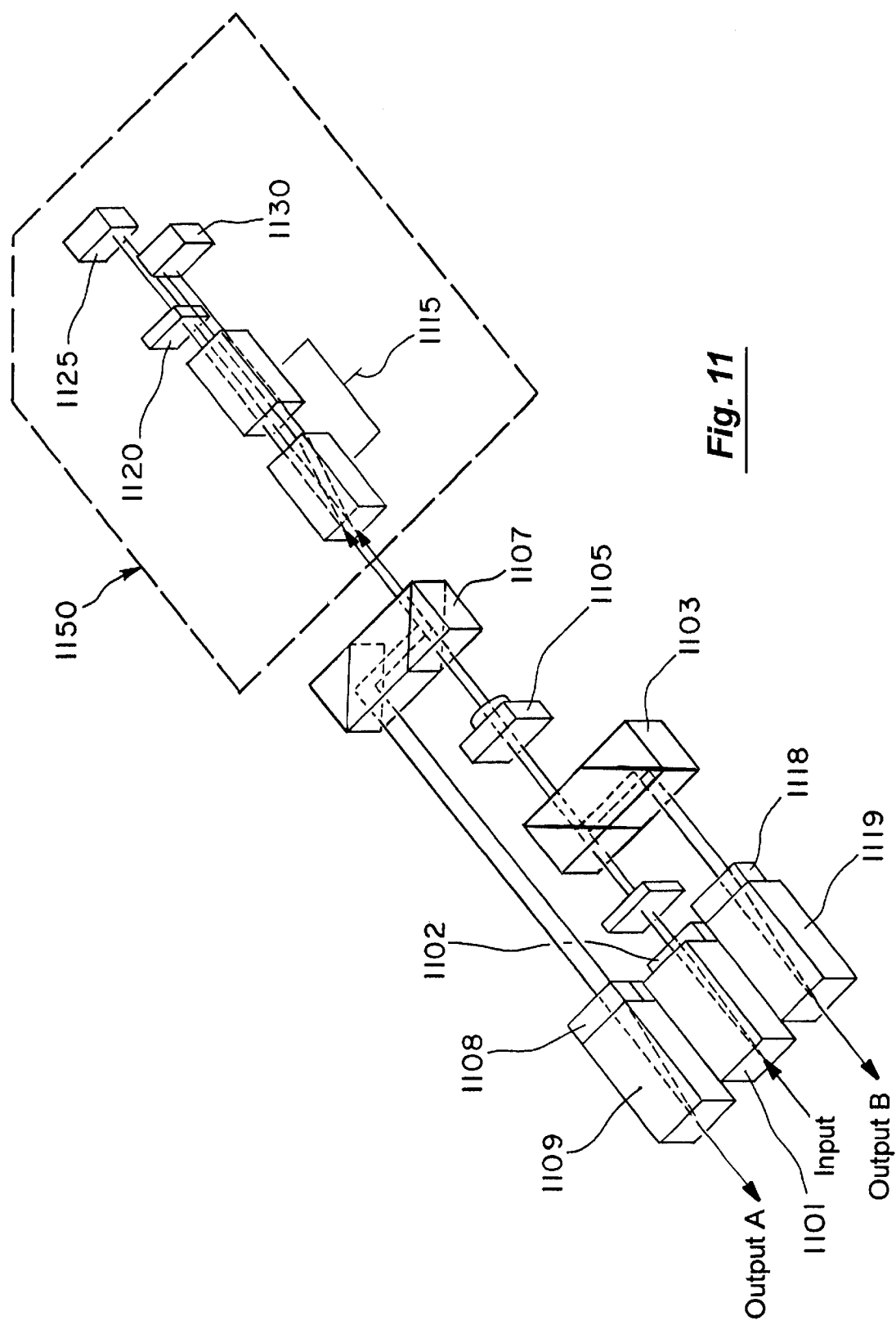
FIG. 11 is an isometric view of another embodiment of the optical wavelength router.

Optical Wavelength Routers Using A Fabry-Perot Resonator. FIG. 11 is an isometric view of an optical wavelength router demonstrating another alternative architecture. The input optical beam initially passes through a beam displacer 1101 (e.g., a birefringent element) and becomes a pair of orthogonally-polarized beams, as previously discussed. A polarization rotator 1102 (e.g., a half-wave plate) rotates the polarization of one of the beams by 90 degrees, so that both beams have substantially the same polarization. The beam pair then passes through a polarized beamsplitter (PBS) 1103.

The beams are then incident onto a non-reciprocal element, such as a Faraday rotator 1105, which is used to separate the back-propagating beams from the polarized input beams propagating in the forward direction. As shown in FIGS. 17(*a*) and 17(*b*), the Faraday rotator is a magneto-optic element such as a doped garnet crystal 1701 (e.g., YIG) bonded to a half-wave plate 1702. The crystal 1701 rotates the input polarization by 45 degrees and the half-wave plate 1702 has its optical axis at 22.5 degrees. Thus, the Faraday rotator 1105 transmits light in the forward direction without changing its polarization, as shown in FIG. 17(*a*), but rotates the polarization of any light from the opposite direction by a predetermined degree (e.g., 90 degrees), as shown in FIG. 17(*b*). In the present invention shown in FIG. 11, the Faraday rotator 1105 transmits the polarized input beam pair in the forward direction without changing their polarization, but rotates the polarization of the reflected beam pair from the opposite direction by 90 degrees.

The input beam pair exiting the Faraday rotator 1105 in the forward direction then pass through a second PBS 1107. A zero-order beam displacer 1115 splits the beams into two pair of orthogonally-polarized beams. One pair passes through a glass block 1120 having a predetermined thickness, and is then reflected back by a mirror 1125. The other beam pair is reflected back by a Fabry-Perot resonator 1130 (or etalon). As previously discussed, a Fabry-Perot resonator has a partially-reflective front mirror and a totally-reflective back mirror that are spaced a predetermined distance from one another. The resonator 1130 reflects substantially all of the incident optical power back regardless of wavelength, but the group delay of the reflected light is strongly dependent on wavelength.

The two pairs of reflected beams from the mirror 1125 and resonator 1130 are recombined by back-propagation through the beam displacer 1115 and interfere to produce one beam pair again. As previously discussed, these beams have mixed polarization as a function of wavelength.

The second PBS 1107 splits this beam pair into two orthogonal polarizations. One polarization component of each beam is reflected by the second PBS 1107 and is directed toward output port A. In particular, one of the beams reflected by the second PBS 1107 passes through a polarization rotator 1108 (e.g., a half-wave plate), which rotates the beam polarization by 90 degrees so that the beam pair entering the birefringent element 1109 are orthogonally polarized. The birefringent element 1109 associated with output port A combines these orthogonally-polarized beams to produce an output beam containing a predetermined subset of the spectrum of the input beam.

The other polarization component of each beam is transmitted through the second PBS 1107 toward the Faraday rotator 1105 along the same optical paths as polarized input beams, but in the opposite direction. The polarization of the beam pair from the second PBS 1107 is rotated by 90 degrees by the Faraday rotator 1105, as previously discussed, so that they will be separated from the polarized input beams and reflected by the first PBS 1103 toward output port B. One of the beams reflected by the first PBS 1103 passes through a polarization rotator 1118 (e.g., a half-wave plate), which rotates the beam polarization by 90 degrees so that the beam pair entering the birefringent element 1119 are orthogonally polarized. The birefringent element 1119 associated with output port B combines these orthogonally-polarized beams to produce an output beam containing a complementary subset of the spectrum of the input beam.

Figure 13:
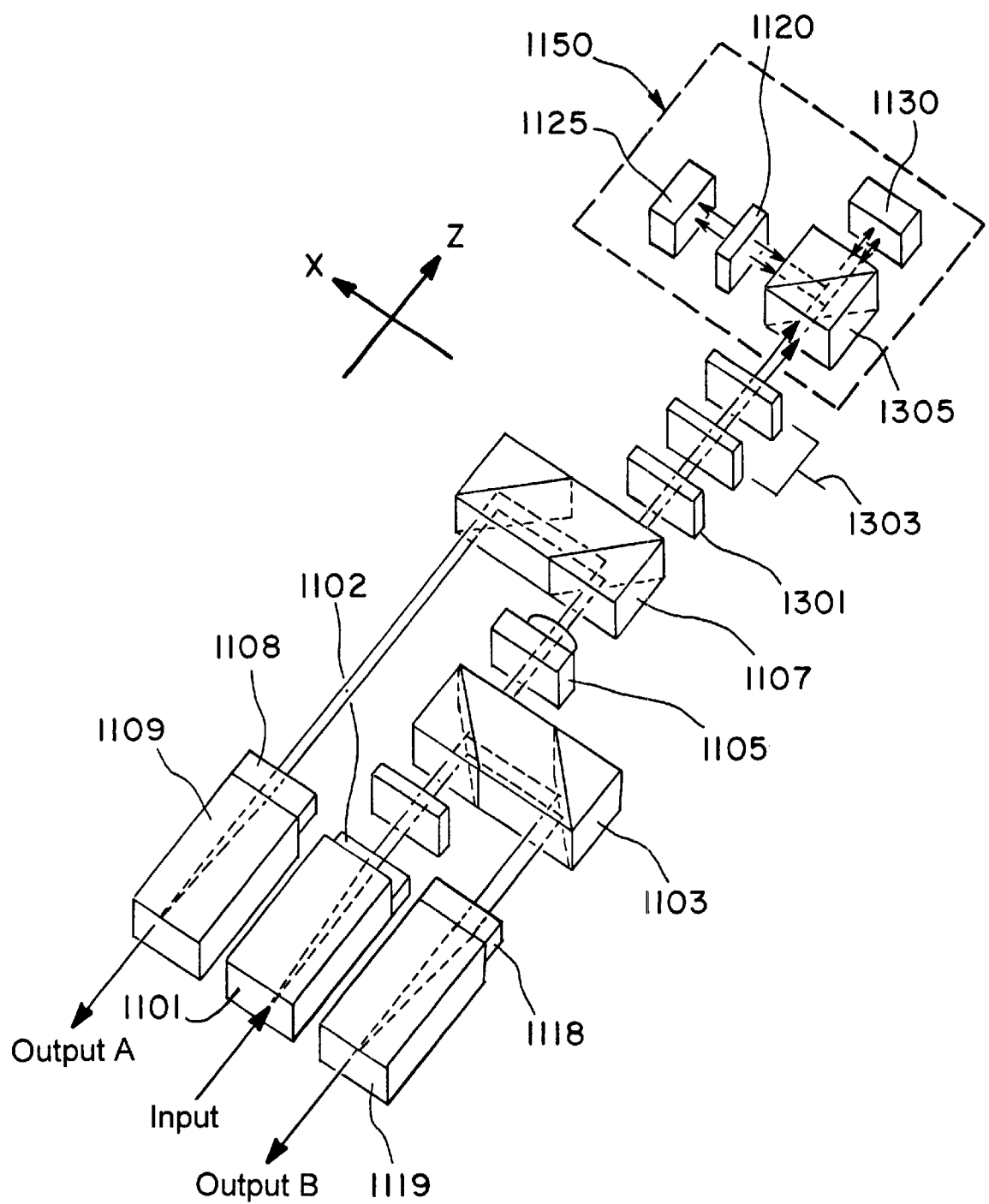
FIG. 13 is an isometric view of another embodiment of the optical wavelength router.

FIG. 13 is an isometric view of another embodiment of the optical wavelength router. After the second PBS 1107, the beam pair is horizontally polarized along the X axis. A half-wave plate 1301 with its optical axis at 22.5 degrees from the X axis rotates the polarization of the beam pair by 45 degrees. A third PBS 1305 splits both beams into two different paths. The horizontally polarized components of the beam pair are transmitted through the third PBS 1305 and are reflected by the resonator 1130, as previously described. The vertically polarized components of the beam pair are reflected by the third PBS 1305. They pass through the glass block 1120 and are reflected back by the mirror 1125. The remainder of this embodiment operates in a manner similar to the embodiment shown in FIG. 11. If needed, one or more waveplates 1303 with optical axes at 45 degrees to the X axis can be inserted between the second PBS 1107 and the third PBS 1305 to allow fine tuning (by angle) of the interferometer's path length.

High precision matching of the free spectral range (FSR) between the interferometer assembly 1150 and the resonator 1130 is difficult to obtain in devices if the beam displacers or waveplates introduce nonzero birefringence. This is due to the dispersion of crystals. The dispersion of beam displacer or waveplate crystals is generally different than that of the resonator 1130. In the architecture of FIG. 11, the zero-order beam displacer 1115 introduces no birefringence to the beam, as previously discussed, therefore making it possible to precisely match the FSR between the interferometer assembly 1150 and the resonator 1130. This means that the present wavelength interleaver can be designed to operate over a very large bandwidth (e.g., the entire C or L band for optical communications). Furthermore, if needed, the zero order beam displacer 1115 can be rotated slightly to fine tune the path length of the interferometer 1150, so that it is correctly matched to that of the resonator 1130. Alternatively, the orientation of the glass block 1120 can be used to change the effective path length of the interferometer 1150.

Figure 12:
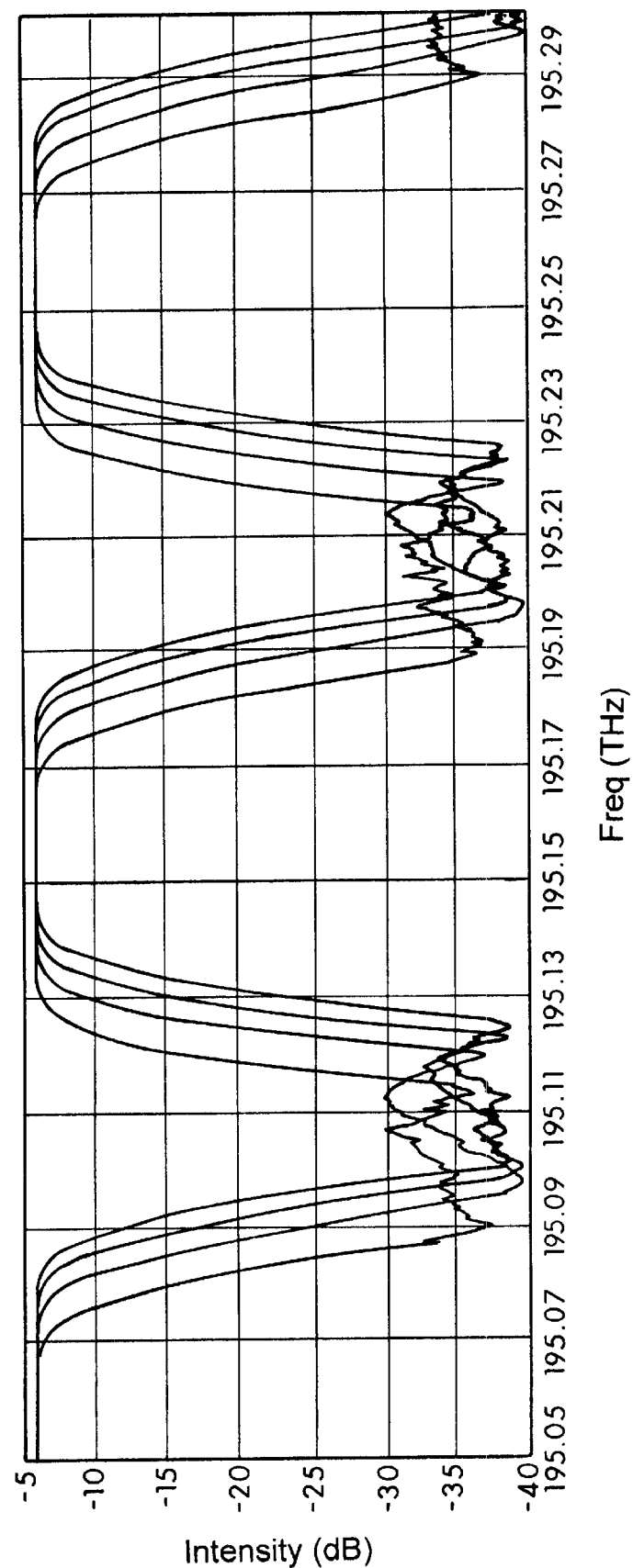
FIG. 12 is a graph showing an example of the spectral response of optical wavelength router depicted in FIG. 11.

One way to precisely match the FSR is by choosing the thickness of the glass block 1120 to be half the thickness of a solid resonator 1130, assuming the resonator 1130 and the glass block 1120 are fabricated from the same material (e.g., fused silica glass). This approach has the added benefit that the temperature drift of the interferometer 1150 and the resonator 1130 is also matched. This means that the shape of the output waveform will be stable over a substantial range of temperatures. For example, FIG. 12 is a graph showing an experimental result of the output spectral response of the wavelength router using fused silica to implement the glass block 1120 and resonator 1130. The waveform shape is seen to be very stable within a temperature range of more than 10° C. As temperature changes, the passband and stopband shapes remain essentially unchanged, while only the center wavelength drifts. This is remarkable given that fused silica has about 1.2 GHz per degree Celsius drift, and a mismatch of only 1 GHz between the center frequencies of the interferometer 1150 and the resonator 1130 can cause significant waveform change. The optical wavelength router shown in FIG. 11 can be easily temperature-controlled to achieve a robust interleaver. It can also be used as a tunable wavelength router with temperature as the tuning mechanism.

Figure 14:
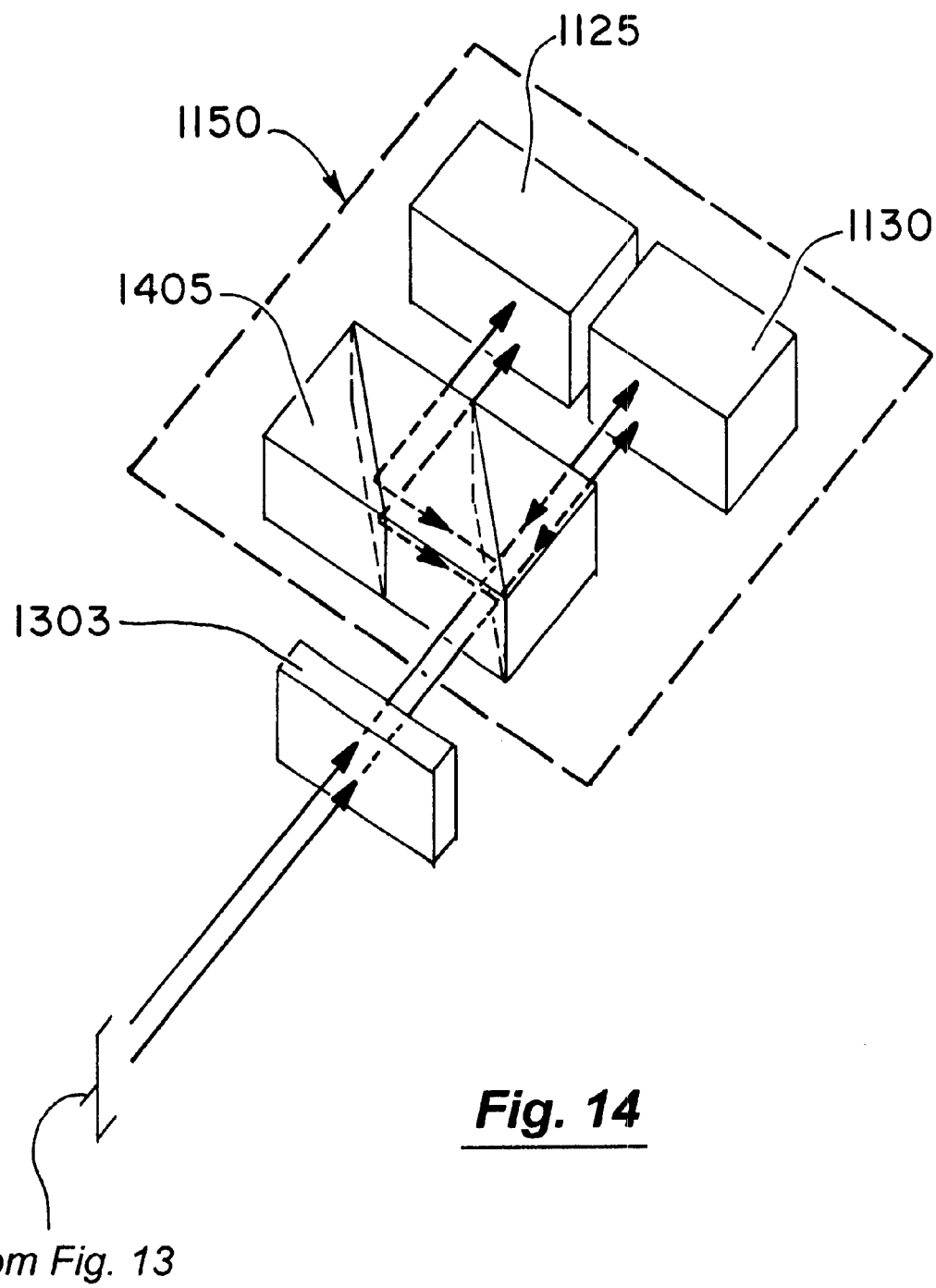
FIG. 14 is an isometric view of another embodiment of the optical wavelength router.
Figure 16A:
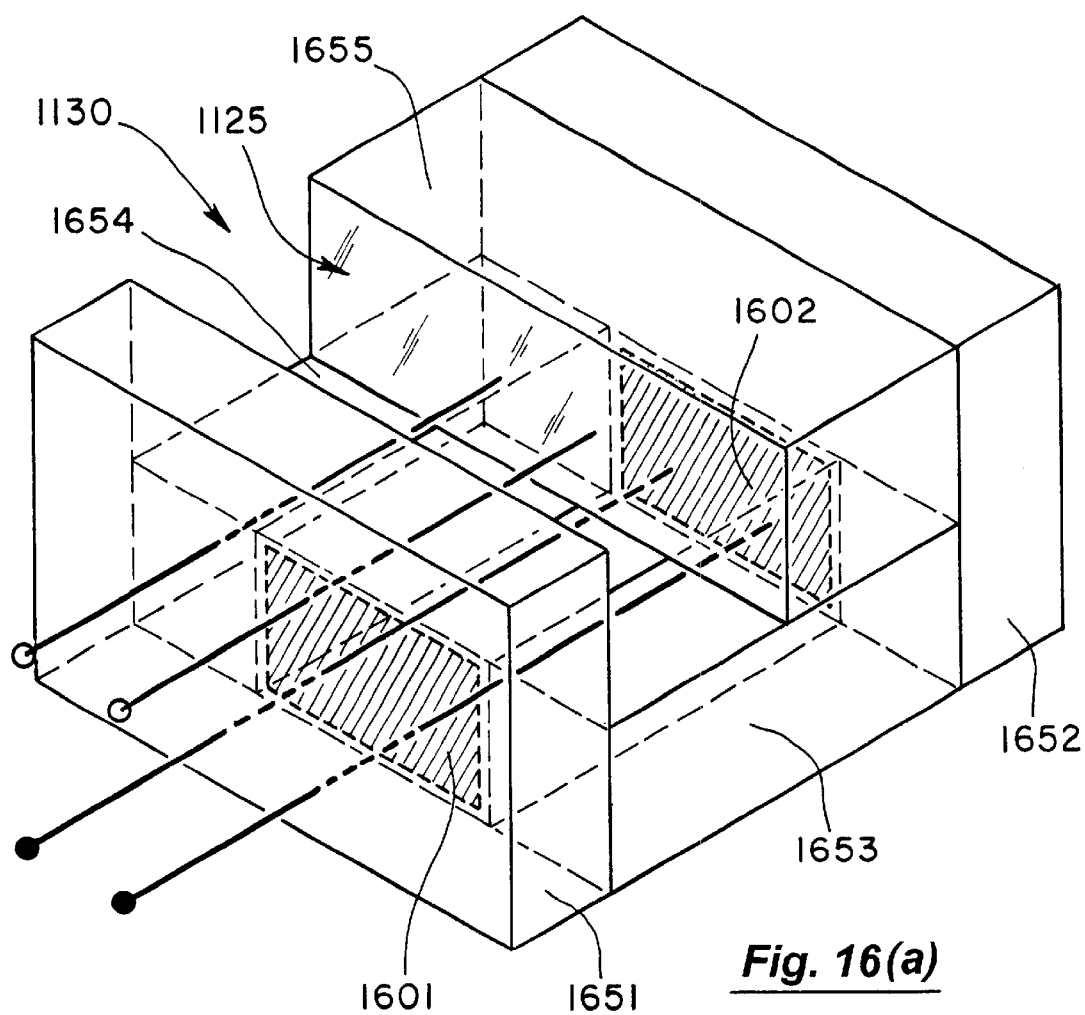
FIG. 16(a) is an ometric view of an air-gap etalon and mirror assembly that can be used, for example, in the embodiments of the optical wavelength router shown in FIGS. 11 and 14.
Figure 16B:
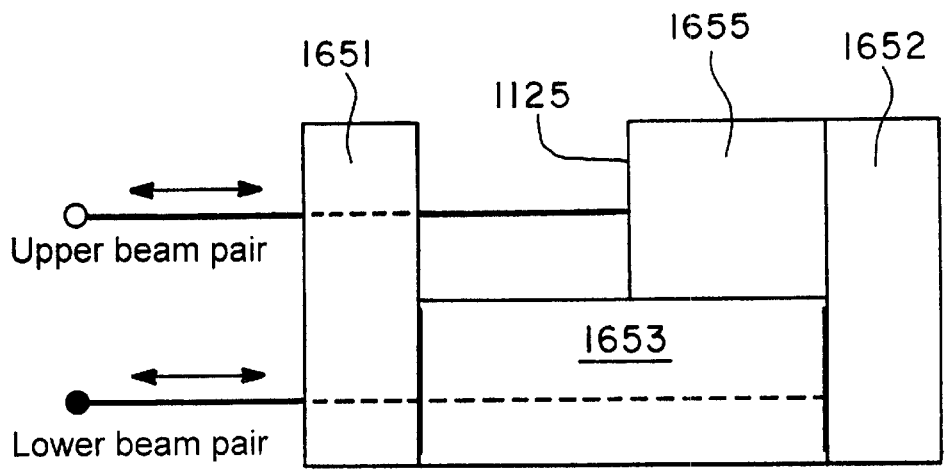
FIG. 16(b) is side view of the air-gap etalon and mirror assembly shown in FIG. 16(a).

Another way to match FSR is by using an air-space resonator 1130 and eliminating the glass block 1120. FIG. 14 is an isometric view of this embodiment of the optical wavelength router. A rhomboid prism 1405 having a PBS coating at one of its interfaces is used in place of the third PBS 1305 in FIG. 13. FIGS. 16(*a*) and 16(*b*) are corresponding isometric and side views, respectively, of the air-gap resonator and mirror assembly. Both of the beam pairs pass through a transparent front member 1651. The upper beam pair pass through the air gap between the front member 1651 and rear mirror member 1655, and are reflected by a mirror surface 1125 on the front of the rear mirror member 1655. The lower portion of the rear surface of the front member 1651 has a partially reflective coating 1601, which serves as the front surface of the resonator 1130. The lower portion of the front surface of the rear member 1652 has a reflective coating, which serves as the rear surface of the resonator 1130. An air gap separates the front and rear surfaces 1601 and 1602 of the resonator 1130.

Two lateral spacers 1653 and 1654 provide structural support and maintain dimensional accuracy of the air gap. The entire framework 1651–1655 of the assembly supporting these reflective surfaces is preferably made of a low-expansion material such as Zerodur or ULE glass.

By properly adjusting the air path length of the mirror arm, the FSR of the interferometer 1150 can be precisely matched to that of the air-space etalon 1130. The air-space etalon 1130 can be made to have very low temperature drift. For example, a total drift of as low as +/−2 GHz over 100° C. can be obtained. This makes it possible to construct a passive optical interleaver that requires no temperature control. In addition, the air-spaced etalon and the air-path interferometer can be pressure-tuned to an exact wavelength, such as those defined by the International Telecommunications Union (ITU).

Figure 15:
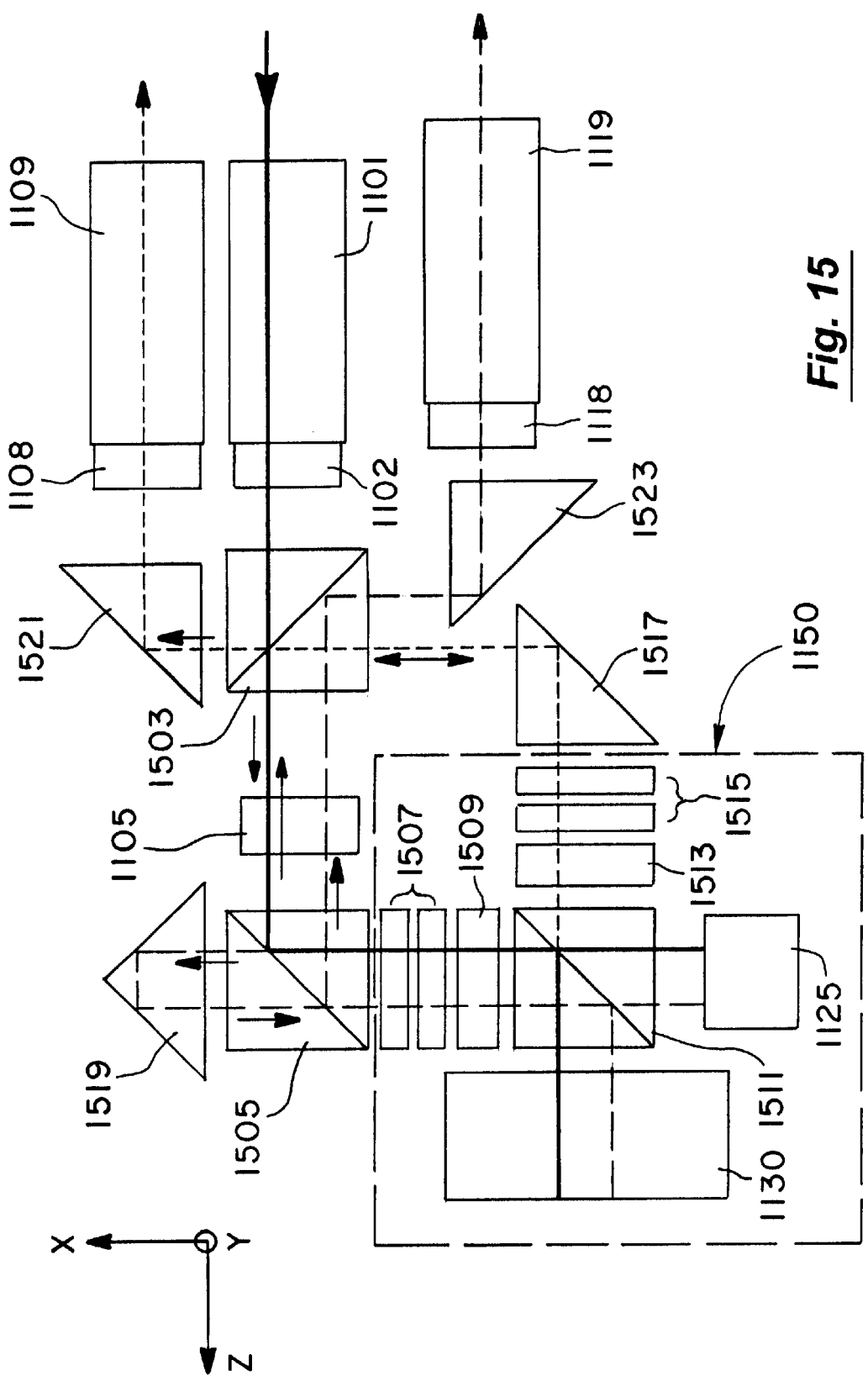
FIG. 15 a schematic diagram of a two-stage embodiment of the optical wavelength router.

In some cases, it may be desirable to cascade the optical interleaver to achieve faster roll-off of the filter response and better cross-talk isolation between adjacent channels. The embodiment shown in FIG. 13 has the added benefit of being easily cascadable. FIG. 15 is a schematic diagram of a very compact, two-stage embodiment of the optical wavelength router. The input beam passes through the first beam displacer 1101 and polarization rotator 1102 to become a pair of beams having the same polarization, as previously discussed. The beam pair passes through the first PBS 1503 and the Faraday rotator 1105 and are reflected by the second PBS 1505. The beam pair then enters the interferometer 1150. Here again, the waveplates 1507 are used to fine tune the interferometer 1130, and their axes are at 45 degrees from the X axis. The half-wave plate 1509 has its optical axis at 22.5 degrees relative the X axis, which rotates the polarization of the beam pair by 45 degrees. The previous description of the interferometers in FIGS. 13 and 11 also apply to the interferometer in the present embodiment. After passing through the waveplates 1507 and half-wave plate 1509, the input beam pair are separated into two pairs of orthogonally-polarized beams by the third PBS 1511. One pair of components are transmitted through the third PBS 1511 and are reflected by the resonator 1130, as previously described. The other pair of components are reflected by the third PBS 1511 toward the mirror 1125. Both pairs of reflected beams from the mirror 1125 and resonator 1130 combine and interfere in the third PBS 1305 to produce a beam pair having mixed polarization as a function of wavelength.

After the first pass through the interferometer 1150, these mixed polarization beams are split into two pairs of beams by the second PBS 1505. One beam pair is horizontally polarized along the Z axis and propagates through the second PBS 1505. The other beam pair is vertically polarized along the Y axis and is reflected by the second PBS 1505.

Both of these beam pairs are then redirected back into the interferometer 1150 for a second pass. The beam pair passing through the second PBS 1505 after the first pass are retro-reflected by a right angle prism 1519 back into the interferometer 1150. The resulting beam pair after the second pass are reflected by the second PBS 1505 before passing through the Faraday rotator. These beams are then directed to output port B by the first PBS 1503.

The other beam pair exiting the interferometer 1150 after the first pass are reflected by the first PBS 1503 and reflector 1517 to re-enter the interferometer 1150 through waveplates 1515 and half-wave plate 1513 for a second pass. The beam pair resulting from the second pass are reflected by reflector 1517 and transmitted through the first PBS 1503 to reflector 1521, which directs the beam pair to output port A.

In each of the embodiments of the present invention discussed above, the incident beams are substantially normal to the etalon and mirror surfaces. It should be expressly understood that the incident beams need not be exactly normal to the etalon and mirror surfaces. When the incident beam is tilted, the reflected beams do not exactly retrace the incident beam path. This arrangement can be used to reduce back-reflection into the input fiber (thereby improving the device's return loss), and to further reduce the noise originating from the reflections of the output ports. The tilted-incidence arrangement can also be exploited to allow the use of a dual-fiber collimator assembly for better packaging. In this case, one fiber of the dual-fiber collimator is used as the input and the other fiber receives one of the reflected output signals.

The present invention can also be used as a multiplexer to combine two input signals to form one output. This can be done by a simple change in the orientation of the Faraday rotator and is obvious to persons familiar with the art.

The above disclosure sets forth a number of embodiments of the present invention. Other arrangements or embodiments, not precisely set forth, could be practiced under the teachings of the present invention and as set forth in the following claims.

We claim:

1. A method for optical wavelength routing comprising:

separating at least a portion of an input beam into a pair of beams having orthogonal polarizations, wherein the input beam comprises a plurality of wavelength channels;

rotating the polarization of at least one of the beams so that both beams have a first polarization;

separating the pair of beams into two pairs of orthogonally-polarized beams;

providing a mirror to reflect one beam of both pairs of orthogonally-polarized beams;

providing a resonator having a partially reflective front mirror and a reflective back mirror spaced a predetermined distance from the front mirror to reflect the other beam of both pairs of orthogonally-polarized beams;

processing the beam pairs reflected by the mirror and resonator to produce two beams having mixed polarization as a function of wavelength; and separating the polarized components of the mixed-polarization beams to produce at least a portion of two output beams, wherein the first output beam comprises a first subset of the wavelength channels and the second output beam comprises a second subset of the wavelength channels that is complementary to the first subset.

2. The method of claim 1 wherein the step of separating the input beam into a pair of beams is performed by a birefringent element.

3. The method of claim 1 wherein the step of separating the polarized components of the mixed-polarization beams is performed by a polarized beamsplitter.

4. The method of claim 1 wherein the step of processing the beam pairs is performed by a birefringent element.

5. The method of claim 1 wherein the step of processing the beam pairs is performed by a zero-order beam displacer.

6. The method of claim 1, wherein the step of separating the polarized components of the mixed-polarization beams is performed by a polarized beamsplitter.

7. The method of claim 1, wherein the step of processing the beam pairs is performed by a polarized beamsplitter.

8. An optical wavelength router comprising:
a beam displacer element separating at least a portion of an input beam into a pair of beams having orthogonal polarizations, wherein the input beam comprises a plurality of wavelength channels;
a polarization rotator rotating the polarization of at least one of the beams so that both beams have a first polarization;
a first polarization dependent routing element separating the beam pair into two pairs of orthogonally-polarized beams;
a mirror reflecting one-beam of both pairs of orthogonally-polarized beams;
a resonator reflecting the other beam of both pairs of orthogonally-polarized beams, said resonator having:
  (a) a partially reflective front mirror; and
  (b) a reflective back mirror spaced a predetermined distance from the front mirror;
wherein the first polarization dependent routing element processes the beam pairs reflected from the mirror and resonator to produce two beams having mixed polarization as a function of wavelength; and
a second polarization-dependent routing element separating the polarized components of the mixed-polarization beams to produce at least a portion of two output beams, wherein the first output beam comprises a first subset of the wavelength channels and the second output beam comprises a second subset of the wavelength channels that is complementary to the first subset.

9. The optical wavelength router of claim 8 wherein the first polarization dependent routing element comprises a zero-order beam displacer.

10. The optical wavelength router of claim 9 wherein the zero-order beam displacer comprises:
a first birefringent element having its optical axis-oriented in a predetermined direction; and
a second birefringent element having its optical axis oriented at an angle relative to the optical axis of the first birefringent element.

11. The optical wavelength router of claim 9 wherein the zero-order beam displacer comprises:
a first birefringent element having its optical axis oriented in a predetermined direction;
a second birefringent element having its optical axis oriented at an angle relative to the optical axis of the first birefringent element; and
a zero-order half-wave plate between the first and second birefringent elements.

12. The optical wavelength router of claim 8 wherein the second polarization-dependent routing element comprises a polarized beamsplitter.

13. The optical wavelength router of claim 8 further comprising a glass block having a predetermined thickness along an optical path between the beam displacer and mirror.

14. The optical wavelength router of claim 8 further comprising an air space between the front mirror and back mirror of the resonator.

15. The optical wavelength router of claim 8, wherein the second polarization-dependent routing element comprises a polarized beamsplitter.

16. An optical wavelength router comprising:
a polarization rotator converting at least a portion of an input beam to a first polarization;
a first polarization-dependent routing element routing the polarized beam along a first optical path;
a non-reciprocal element rotating the polarization of the beam from the first polarization-dependent routing element by a predetermined degree, and rotating the polarization of light from the opposite direction by a different degree;
a second polarization-dependent routing element routing the beam from the nonreciprocal element along a predetermined optical path;
a third polarization-dependent routing element separating the beam from the second polarization-dependent routing element into two orthogonally-polarized beams;
a mirror reflecting one of the orthogonally-polarized beams from the third polarization-dependent routing element;
a resonator reflecting the second of the orthogonally-polarized beams, said resonator having:
  (a) a partially-reflective front mirror; and
  (b) a reflective back mirror spaced a predetermined distance from said front mirror;
wherein the beams reflected by the resonator and mirror are processed within the third polarization-dependent routing element to produce a beam having mixed polarization as a function of wavelength;
wherein the second polarization-dependent routing element separates the polarized components of the mixed-polarization beam so that the component of the mixed-polarization beam having the first polarization is routed along the first optical path through the non-reciprocal element, and the component of the mixed-polarization beam having a polarization orthogonal to the first polarization is routed to produce a first output beam containing a subset of the optical spectrum of the input beam;
wherein the non-reciprocal element rotates the polarization of the beam along the first optical path from the second polarization-dependent routing element so that it has a polarization orthogonal to that of the polarized input beam from the first polarization-dependent routing element; and
wherein the first polarization-dependent routing element separates the polarized input beam from the beam exiting the non-reciprocal element to produce a second output beam containing a complementary subset of the optical spectrum of the input beam.

17. The optical wavelength router of claim 16 wherein the third polarization-dependent routing element comprises a zero-order beam displacer.

18. The optical wavelength router of claim 17 wherein the zero-order beam displacer comprises:
a first birefringent element having its optical axis oriented in a predetermined direction; and
a second birefringent element having its optical axis oriented at approximately 90 degrees relative to the optical axis of the first birefringent element.

19. The optical wavelength router of claim 17 wherein the zero-order beam displacer comprises:
a first birefringent element having its optical axis oriented in a predetermined direction;
a second birefringent element having its optical axis oriented at approximately 90 degrees relative to the optical axis of the first birefringent element; and
a zero-order half-wave plate between the first and second birefringent elements.

20. The optical wavelength router of claim 16 wherein the third polarization-dependent routing element comprises a polarized beamsplitter.

21. The optical wavelength router of claim 16 further comprising a half-wave plate between the second and third polarization-dependent routing elements rotating the polarization of the beam by approximately 45 degrees.

22. The optical wavelength router of claim 16 wherein the non-reciprocal element comprises a Faraday rotator.

23. The optical wavelength router of claim 16 further comprising at least one waveplate between the second and third polarization-dependent routing elements to allow tuning of the optical path length.

24. The optical wavelength router of claim 16 further comprising an air space between the front mirror and back mirror of the resonator.

25. An optical wavelength router comprising:

a first beam displacer separating an input beam into a pair of orthogonally-polarized beams;

a first polarization rotator rotating the polarization of at least one of the beams so that both beams have a first polarization;

a first polarization-dependent routing element routing the beam pair along a first optical path;

a non-reciprocal element rotating the polarization of the beam pair from the first polarization-dependent routing element by a predetermined degree, and rotating the polarization of light from the opposite direction by a different degree;

a second polarization-dependent routing element routing the beam pair from the non-reciprocal element along a predetermined optical path;

a third polarization-dependent routing element separating the beam pair from the second polarization-dependent routing element into two pairs of orthogonally-polarized beams;

a mirror reflecting one beam of both pairs of orthogonally-polarized beams;

a resonator reflecting the second beam of both pairs of orthogonally-polarized beams, said resonator having:
    (a) a partially-reflective front mirror; and
    (b) a reflective back mirror spaced a predetermined distance from the front mirror;

wherein the beam pairs reflected by the resonator and mirror are processed within the third polarization-dependent routing element to produce two beams having mixed polarization as a function of wavelength;

wherein the second polarization-dependent routing element separates the polarized components of the mixed-polarization beams so that those components of the mixed-polarization beams having the first polarization are routed as a pair of beams along the first optical path through the non-reciprocal element, and those components of the mixed-polarization beams having a polarization orthogonal to the first polarization are routed as a pair of beams along a second optical path:

a second polarization rotator rotating the polarization of at least one of the beam pair along the second optical path so that the beam pair becomes orthogonally polarized;

a second beam displacer combining the orthogonally-polarized beam pair from the second polarization rotator to produce a first output beam containing a subset of the optical spectrum of the input beam;

wherein the non-reciprocal element rotates the polarization of the beam pair along the first optical path from the second polarization-dependent routing element so that they have a polarization orthogonal to the first polarization;

wherein the first polarization-dependent routing element separates the input beam pair from the beam pair exiting the non-reciprocal element;

a third polarization rotator rotating the polarization of at least one of the beam pair from the first polarization-dependent routing element so that the beam pair becomes orthogonally polarized;

and a third beam displacer combining the orthogonally-polarized beam pair from the third polarization rotator to produce a second output beam containing a complementary subset of the optical spectrum of the input beam.

26. The optical wavelength router of claim 25 wherein the third polarization-dependent routing element comprises a zero-order beam displacer.

27. The optical wavelength router of claim 26 wherein the zero-order beam displacer comprises:

a first birefringent element having its optical axis oriented in a predetermined direction; and a second birefringent element having its optical axis oriented at approximately 90 degrees relative to the optical axis of the first birefringent element.

28. The optical wavelength router of claim 26 wherein the zero-order beam displacer comprises:

a first birefringent element having its optical axis oriented in a predetermined direction;

a second birefringent element having its optical axis oriented at approximately 90 degrees relative to the optical axis of the first birefringent element; and a zero-order half-wave plate between the first and second birefringent elements.

29. The optical wavelength router of claim 25 wherein the third polarization-dependent routing element comprises a polarized beamsplitter.

30. The optical wavelength router of claim 25 further comprising a half-wave plate between the second and third polarization-dependent routing elements rotating the polarization of the beam pair by approximately 45 degrees.

31. The optical wavelength router of claim 25 wherein said nonreciprocal element comprises a Faraday rotator.

* * * * *